(12) United States Patent
Shotan et al.

(10) Patent No.: US 11,933,920 B2
(45) Date of Patent: Mar. 19, 2024

(54) METHODS AND SYSTEMS FOR DETECTING OBSTRUCTIONS ON A SENSOR HOUSING

(71) Applicant: WAYMO LLC, Mountain View, CA (US)

(72) Inventors: Gil Shotan, Mountain View, CA (US); Luke Wachter, Mountain View, CA (US); Colin Braley, Mountain View, CA (US); Christian Lauterbach, Mountain View, CA (US); Xiaoxiang Hu, Mountain View, CA (US); Ming Zou, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 284 days.

(21) Appl. No.: 17/437,115

(22) PCT Filed: Mar. 13, 2020

(86) PCT No.: PCT/US2020/022804
§ 371 (c)(1),
(2) Date: Sep. 17, 2020

(87) PCT Pub. No.: WO2020/186236
PCT Pub. Date: Sep. 17, 2020

(65) Prior Publication Data
US 2022/0179057 A1  Jun. 9, 2022

Related U.S. Application Data
(60) Provisional application No. 62/818,707, filed on Mar. 14, 2019.

(51) Int. Cl.
*G01C 3/08* (2006.01)
*G01S 7/481* (2006.01)
(Continued)

(52) U.S. Cl.
CPC ............ *G01S 7/497* (2013.01); *G01S 7/4813* (2013.01); *G01S 7/4814* (2013.01); *G01S 17/931* (2020.01); *G01S 2007/4977* (2013.01)

(58) Field of Classification Search
CPC ...... G01S 7/497; G01S 7/4813; G01S 7/4814; G01S 17/931; G01S 2007/4977
See application file for complete search history.

(56) References Cited

U.S. PATENT DOCUMENTS

| 10,189,429 B2 | 1/2019 | Krishnan et al. |
| 10,983,198 B2 | 4/2021 | Fujita |

(Continued)

FOREIGN PATENT DOCUMENTS

| AT | 2016244777 B2 * | 5/2018 | .......... G01S 17/931 |
| CN | 102313909 A | 1/2012 | |

(Continued)

OTHER PUBLICATIONS

The International Search Report (ISR) with Written Opinion for PCT/US2020/022804 dated Jul. 1, 2020, pp. 1-8.

*Primary Examiner* — Mark Hellner
(74) *Attorney, Agent, or Firm* — McDonnell Boehnen Hulbert & Berghoff LLP

(57) ABSTRACT

One example method involves obtaining a plurality of scans of a field-of-view (FOV) of a light detection and ranging (LIDAR) device disposed inside a housing. Obtaining each scan of the plurality of scans comprises: transmitting, through a plurality of sections of the housing, a plurality of light pulses emitted from the LIDAR device in different directions toward the housing; and detecting a plurality of returning light pulses comprising reflected portions of the transmitted plurality of light pulses that are reflected back toward the LIDAR device. The method also involves detecting an obstruction that at least partially occludes the LIDAR (Continued)

device from scanning the FOV through the housing based on the plurality of scans.

20 Claims, 10 Drawing Sheets

(51) Int. Cl.
  *G01S 7/497* (2006.01)
  *G01S 17/931* (2020.01)

(56) References Cited

U.S. PATENT DOCUMENTS

| | | |
|---|---|---|
| 2004/0257556 A1 | 12/2004 | Samukawa et al. |
| 2011/0286009 A1 | 11/2011 | Lohmann |
| 2015/0055117 A1 | 2/2015 | Pennecot et al. |
| 2016/0282468 A1 | 9/2016 | Gruver et al. |
| 2017/0115387 A1 | 4/2017 | Luders et al. |
| 2018/0143298 A1 | 5/2018 | Newman |
| 2018/0188362 A1 | 7/2018 | Fujita |
| 2018/0217242 A1 | 8/2018 | Lombrozo et al. |
| 2018/0284268 A1 | 10/2018 | McWhirter |
| 2019/0009752 A1* | 1/2019 | Rice .................. B60S 1/56 |
| 2019/0212418 A1* | 7/2019 | Lee .................. G01S 7/4813 |

FOREIGN PATENT DOCUMENTS

| | | |
|---|---|---|
| JP | H07-280925 A | 10/1995 |
| JP | 2005-257322 | 9/2005 |
| JP | 2005-265439 | 9/2005 |
| JP | 2011-013135 A | 1/2011 |
| JP | 2017-067559 | 4/2017 |
| JP | 2017-181105 | 10/2017 |
| JP | 2018-072288 A | 5/2018 |
| WO | 2016/208373 A1 | 12/2016 |
| WO | 2018187089 A1 | 10/2018 |

* cited by examiner

METHODS AND SYSTEMS FOR DETECTING OBSTRUCTIONS ON A SENSOR HOUSING

CROSS-REFERENCE TO RELATED APPLICATION

This application is a U.S. National Phase of International Application No. PCT/US2020/022804, filed Mar. 13, 2020, which claims priority to U.S. Provisional Application No. 62/818,707, filed Mar. 14, 2019, both of which are incorporated by reference herein in their entirety.

BACKGROUND

Active sensors, such as light detection and ranging (LIDAR) sensors, radio detection and ranging (RADAR) sensors, sound navigation and ranging (SONAR) sensors, among others, are sensors that can scan a surrounding environment by emitting signals toward the surrounding environment and detecting reflections of the emitted signals.

For example, a LIDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a method is provided. The method involves obtaining a plurality of scans of a field-of-view (FOV) of a light detection and ranging (LIDAR) device disposed inside a housing. Obtaining each scan of the plurality of scans comprises: transmitting, through a plurality of sections of the housing, a plurality of light pulses emitted from the LIDAR device in different directions toward the housing; and detecting a plurality of returning light pulses comprising reflected portions of the transmitted plurality of light pulses that are reflected back toward the LIDAR device. The method also involves detecting an obstruction that at least partially occludes the LIDAR device from scanning the FOV through the housing based on the plurality of scans.

In another example, a light detection and ranging (LIDAR) device is provided. The LIDAR device includes a housing and a controller. The controller is configured to cause the LIDAR device to perform operations. The operations comprise obtaining a plurality of scans of a field-of-view (FOV) of the LIDAR device. The operations further comprise, for each scan of the plurality of scans, transmitting, through the housing, a plurality of light pulses emitted from the LIDAR device in different directions toward the housing. The operations further comprise, for each scan of the plurality of scans, detecting a plurality of returning light pulses comprising reflected portions of the transmitted plurality of light pulses. The operations further comprise detecting an obstruction that at least partially occludes the LIDAR device from scanning the FOV through the housing based on the plurality of scans.

In yet another example, a system is provided. The system includes a housing and a light detection and ranging (LIDAR) device disposed inside the housing. The LIDAR device is configured to scan a field-of-view (FOV) through the housing. The LIDAR device is configured to transmit, for each scan of the FOV, a plurality of light pulses emitted from the LIDAR device in different directions toward the housing. The LIDAR device is configured to receive, for each scan of the FOV, a plurality of returning light pulses comprising reflected portions of the transmitted plurality of light pulses reflected back to the LIDAR device. The LIDAR device also includes one or more processors and data storage storing instructions that, when executed by the one or more processors, cause the system to perform operations. The operations comprise receiving, from the LIDAR device, data indicative of a plurality of scans of the FOV obtained by the LIDAR device. The operations also comprise detecting an obstruction that at least partially occludes the LIDAR device from scanning the FOV through the housing based on the received data.

In still another example, a system includes means for obtaining a plurality of scans of a field-of-view (FOV) of a light detection and ranging (LIDAR) device disposed inside a housing. Obtaining each scan of the plurality of scans comprises: transmitting, through the housing, a plurality of light pulses emitted from the LIDAR device in different directions toward the housing; and detecting a plurality of returning light pulses comprising reflected portions of the transmitted plurality of light pulses that are reflected back toward the LIDAR device. The system also comprises means for detecting an obstruction that at least partially occludes the LIDAR device from scanning the FOV through the housing based on the plurality of scans.

These as well as other aspects, advantages, and alternatives, will become apparent to those of ordinary skill in the art by reading the following detailed description, with reference where appropriate to the accompanying figures.

DETAILED DESCRIPTION

Figure 1A:
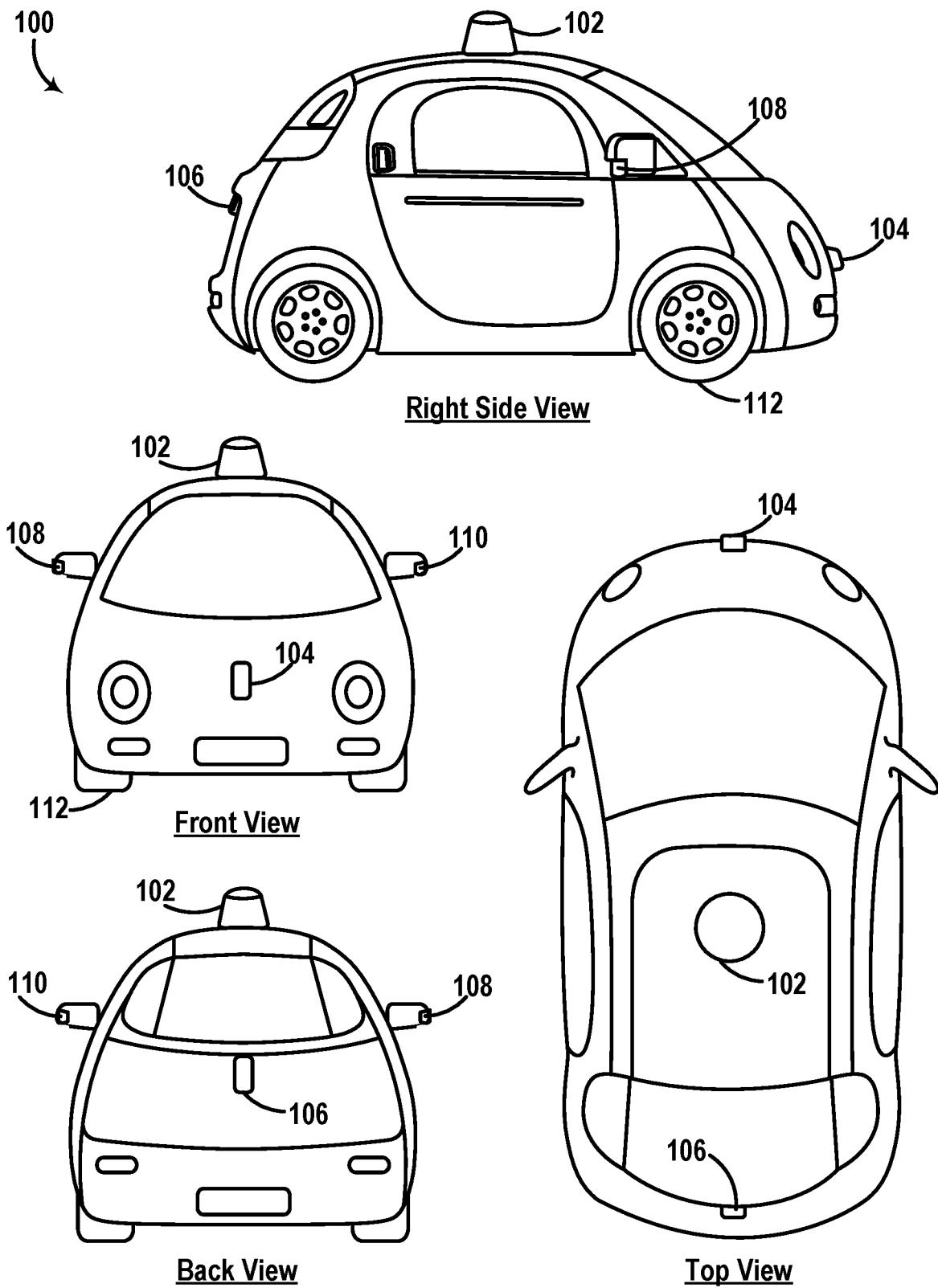
FIG. 1A illustrates a vehicle, according to an example embodiment.

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations.

I. OVERVIEW

In some scenarios, a FOV of an active sensor may become occluded (at least partially) by objects, obstacles, debris, dirt, scratches, deformations, and/or other types of obstructions. An obstruction may prevent one or more signals (or portions thereof) transmitted by the active sensor from reaching regions of the environment that are behind the obstruction, and/or prevent one or more signals (or portions thereof) propagating from the environment from being received by the active sensor. Some types of obstructions may be physically separated from (e.g., not attached to) the active sensor. Other types of obstructions may be disposed on or otherwise attached to the active sensor (e.g., accumulated dirt or other debris disposed on the active sensor, etc.).

Some example implementations herein relate to the detection of obstructions that at least partially occlude a FOV of a sensor.

One example system herein includes a LIDAR device disposed inside a housing. The LIDAR may be configured to scan a FOV by emitting light pulses and detecting returning reflections of the emitted light pulses. To facilitate this, the housing may include or may be formed from one or more optical components (e.g., light filter(s), optical window(s), etc.) that at least partially transmit the emitted light pulses out of the housing and the reflected light pulses into the housing.

The system may be configured to obtain a plurality of scans of the FOV of the LIDAR device. Obtaining each scan of the FOV may involve: (i) transmitting a plurality of light pulses emitted from the LIDAR device in different directions toward (and through) the housing; and (ii) detecting a plurality of returning light pulses comprising reflected portions of the transmitted plurality of light pulses. By way of example, a first light pulse emitted from the LIDAR device in a first direction may propagate through a first section of the housing toward the FOV, and a second light pulse emitted in a second direction may propagate through a second section of the housing. In some examples, the first and second sections may correspond to physically separate sections of the housing. Alternatively, in other examples, the first section may at least partially overlap the second section. For example, the first and second light pulses may be configured to diverge away from the LIDAR device along two different diverging beam paths that at least partially intersect one another.

Additionally, the system may be configured to detect an obstruction that at least partially occludes the LIDAR device from scanning the FOV through the housing based on the plurality of scans. For example, where the obstruction is disposed on the housing, the system may detect the obstruction based on light intensities of detected light pulses reflected at the housing back to the LIDAR device (e.g., "feedback returns") and/or on whether the detected light pulses include light pulses that returned from objects out of the housing (e.g., "world returns").

In some examples, the system may be configured to determine whether the obstruction is coupled to the housing. In a first example, this determination may be based light intensities of the feedback returns, ranges of the feedback returns, and/or a count of world returns received from a given section of the housing where the obstruction is present. In a second example, this determination may be based on comparing world returns associated with an object scanned through a first section of the housing during a first scan and through a second section of the housing during a second scan. In a third example, this determination may be based on comparing a first scan of the object obtained using the LIDAR device with a second scan of the object obtained using another sensor (e.g., another LIDAR device) in the system. Other examples are possible as well.

Depending on the type of obstruction, in some examples, the LIDAR device (or the system) could decide how to respond to the detection of the obstruction. In a first example, where the obstruction is determined to be disposed on the housing (e.g., dirt, dust, bird dropping, etc.), the LIDAR device or the system may activate a cleaning mechanism (e.g., liquid spray, high-pressure gas tube, wiper, etc.) to attempt removal of the occlusion. In a second example, where the occlusion is determined to occlude both optical windows (e.g., a plastic bag covering a portion of the LIDAR device, etc.), the LIDAR device may decide to wait for a given amount of time (or a given number of rotations of the housing) for the occlusion to be removed (e.g., an occluding plastic bag may be blown away by wind), or alert a system that uses the LIDAR that the portion of the FOV is occluded, among other possibilities.

II. EXAMPLE SYSTEMS AND DEVICES

Example systems and devices will now be described in greater detail. In general, the embodiments disclosed herein can be used with any system that includes one or more sensors that scan an environment of the system. Illustrative embodiments described herein include vehicles that employ sensors, such as LIDARs, RADARs, SONARs, cameras, etc. However, an example system may also be implemented in or take the form of other devices, such as robotic devices, industrial systems (e.g., assembly lines, etc.), or mobile communication systems or devices, among other possibilities.

The term "vehicle" is broadly construed herein to cover any moving object, including, for instance, an aerial vehicle, watercraft, spacecraft, a car, a truck, a van, a semi-trailer truck, a motorcycle, a golf cart, an off-road vehicle, a warehouse transport vehicle, or a farm vehicle, as well as a carrier that rides on a track such as a roller coaster, trolley, tram, or train car, among other examples.

FIG. 1A illustrates a vehicle 100, according to an example embodiment. In particular, FIG. 1A shows a Right Side View, Front View, Back View, and Top View of the vehicle 100. Although vehicle 100 is illustrated in FIG. 1A as a car, as noted above, other embodiments are possible. Furthermore, in some embodiments, vehicle 100 may be configured to operate in an autonomous mode or a semi-autonomous mode. However, the embodiments described herein are also applicable to vehicles that are not configured to operate autonomously. Thus, the example vehicle 100 is not meant to be limiting. As shown, vehicle 100 includes five sensor units 102, 104, 106, 108, and 110, and four wheels, exemplified by wheel 112.

In some embodiments, each of the sensor units 102-110 may include one or more light detection and ranging devices (LIDARs) that have particular configuration properties to allow scanning an environment around the vehicle 100. Additionally or alternatively, in some embodiments, sensor units 102-110 may include different types of sensors, such as global positioning system sensors, inertial measurement units, radio detection and ranging (RADAR) units, cameras, laser rangefinders, LIDARs, and/or acoustic sensors among other possibilities.

As shown, sensor unit 102 is mounted to a top side of vehicle 100 opposite to a bottom side of vehicle 100 where the wheel 112 is mounted. Further, as shown, sensor units 104-110 are each mounted to a respective side of vehicle 100 other than the top side. For example, sensor unit 104 is positioned at a front side of vehicle 100, sensor 106 is positioned at a back side of vehicle 100, sensor unit 108 is positioned at a right side of vehicle 100, and the sensor unit 110 is positioned at a left side of vehicle 100.

While the sensor units 102-110 are shown to be mounted in particular locations on vehicle 100, in some embodiments, sensor units 102-110 may be mounted elsewhere, either inside or outside vehicle 100. For example, although FIG. 1A shows sensor unit 108 mounted to a rear-view mirror of vehicle 100, sensor unit 108 may alternatively be positioned in another location along the right side of vehicle 100. Further, while five sensor units are shown, in some embodiments more or fewer sensor units may be included in vehicle 100. However, for the sake of example, sensor units 102-110 are positioned as shown in FIG. 1A.

In some embodiments, one or more of sensor units 102-110 may include one or more movable mounts on which sensors may be movably mounted. The movable mount may include, for example, a rotating platform. Sensors mounted on the rotating platform could be rotated so that the sensors may obtain information from various directions around the vehicle 100. For example, sensor unit 102 may include a LIDAR having a viewing direction that can be adjusted by actuating the rotating platform to a different direction, etc. Alternatively or additionally, the movable mount may include a tilting platform. Sensors mounted on the tilting platform could be tilted within a given range of angles and/or azimuths so that the sensors may obtain information from a variety of angles. The movable mount may take other forms as well.

Further, in some embodiments, one or more of sensor units 102-110 may include an actuator configured to adjust the position and/or orientation of sensors in the sensor unit by moving the sensors and/or movable mounts. Example actuators include motors, pneumatic actuators, hydraulic pistons, relays, solenoids, piezoelectric actuators, among other examples.

As shown, vehicle 100 includes one or more wheels such as wheel 112 that are configured to rotate to cause the vehicle to travel along a driving surface. In some embodiments, wheel 112 may include at least one tire coupled to a rim. To that end, wheel 112 may include any combination of metal and rubber, or a combination of other materials. Vehicle 100 may include one or more other components in addition to or instead of those shown.

Figure 1B:
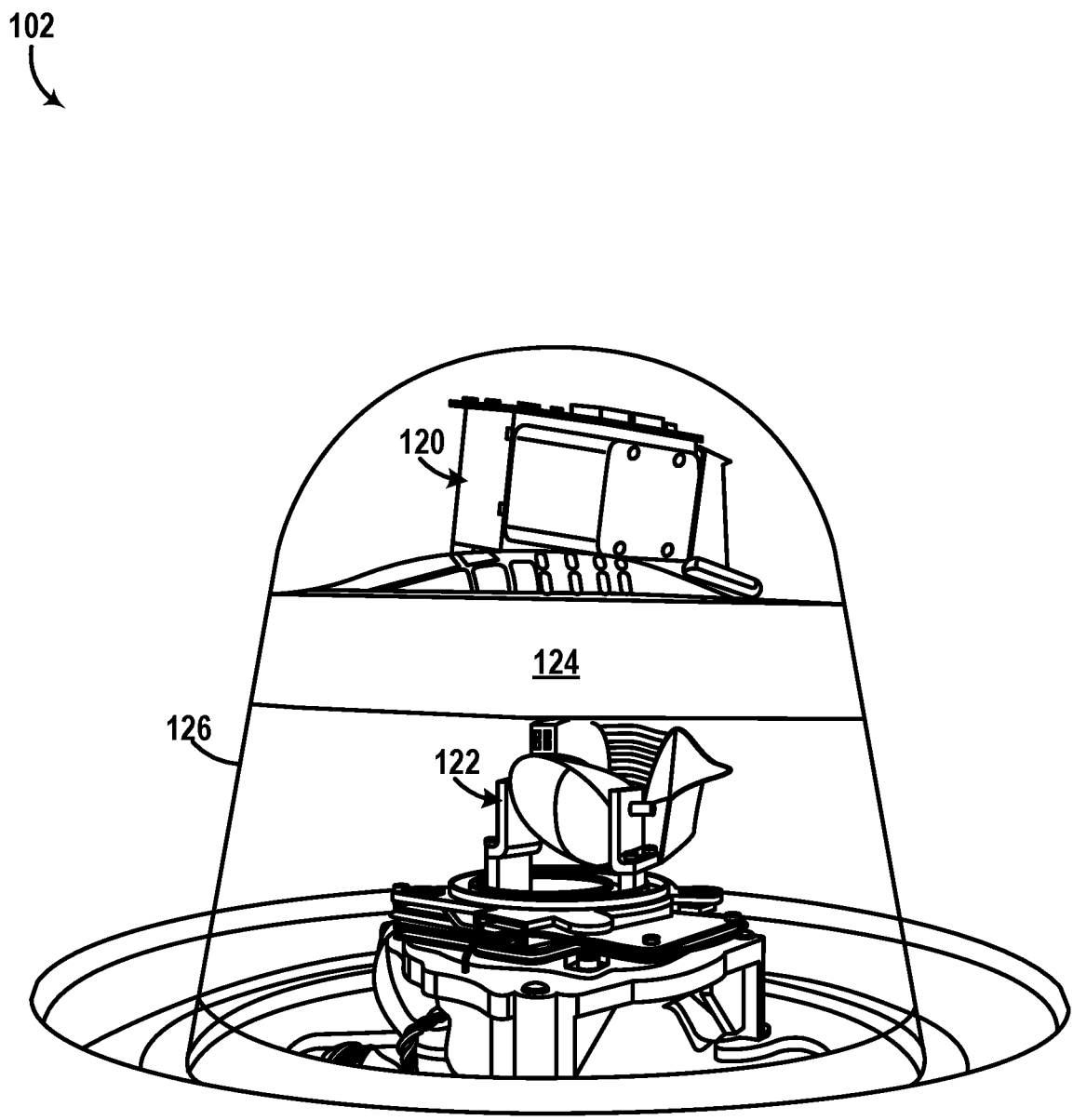
FIG. 1B is a perspective view of a sensor unit positioned at a top side of the vehicle shown in FIG. 1A, according to an example embodiment.

FIG. 1B is a perspective view of sensor unit 102 positioned at the top side of the vehicle 100 shown in FIG. 1A. As shown, sensor unit 102 includes a first LIDAR 120, a second LIDAR 122, a dividing structure 124, and a housing 126. As noted above, sensor unit 102 may additionally or alternatively include other sensors than those shown in FIG. 1B. However, for the sake of example, sensor unit 102 includes the components shown in FIG. 1B.

In some examples, the first LIDAR 120 may be configured to scan an environment around vehicle 100 by rotating about an axis (e.g., vertical axis, etc.) while emitting one or more light pulses and detecting reflections of the light pulses off objects in the environment of the vehicle. In some embodiments, the first LIDAR 120 may be configured to repeatedly rotate about the axis to be able to scan the environment at a sufficiently high refresh rate to quickly detect motion of objects in the environment. In one embodiment, the first LIDAR 120 may have a refresh rate of 10 Hz (e.g., ten complete rotations of the first LIDAR 120 per second), thereby scanning a 360-degree field-of-view (FOV) around the vehicle ten times every second. Through this process, for instance, a 3D map of the surrounding environment may be determined based on data from the first LIDAR 120. In one embodiment, the first LIDAR 120 may include a plurality of light sources that emit 64 laser beams having a wavelength of 905 nm. In this embodiment, the 3D map determined based on the data from the first LIDAR 120 may have a 0.2° (horizontal)×0.3° (vertical) angular resolution, and the first LIDAR 120 may have a 360° (horizontal)×20° (vertical) FOV of the environment. With this configuration, the 3D map may have sufficient resolution to detect or identify objects within a (medium) range of 100 meters from the vehicle 100, for example. However, other configurations (e.g., number of light sources, angular resolution, wavelength, range, etc.) are possible as well.

In some embodiments, the second LIDAR 122 may be configured to scan a narrower FOV of the environment around the vehicle 100. For instance, the second LIDAR 122 may be configured to rotate for less than a complete rotation about the same or similar (e.g., vertical) axis as the first LIDAR 120. Further, in some examples, the second LIDAR 122 may have a lower refresh rate than the first LIDAR 120. With this arrangement for instance, vehicle 100 may determine a 3D map of the narrower FOV of the environment using data from the second LIDAR 122. The 3D map in this case may have a higher angular resolution than the corresponding 3D map determined based on the data from first LIDAR 120, and may thus allow detection/identification of objects that are at a relatively greater distance to the vehicle, as well as identification of smaller objects within the scanning range of the first LIDAR 120. In one embodiment, the second LIDAR 122 may have a FOV of 8° (horizontal)×15° (vertical), a refresh rate of 4 Hz, and may emit a narrow beam having a wavelength of 1550 nm. Further, in this embodiment, the 3D map determined based on the data from the second LIDAR 122 may have an angular resolution of 0.1° (horizontal)×0.03° (vertical), thereby allowing detection/identification of objects within a (long) range of 300 meters from vehicle 100. However, other configurations (e.g., number of light sources, angular resolution, wavelength, range, etc.) are possible as well.

In some examples, vehicle 100 may be configured to adjust a viewing direction of second LIDAR 122. For example, the second LIDAR 122 may be mounted to a stepper motor (not shown) that allows adjusting the viewing direction of the second LIDAR 122 to directions other than the direction shown in FIG. 1B. Thus, in some examples, second LIDAR 122 may be steerable to scan a (narrow) FOV along various viewing directions from the vehicle 100.

Dividing structure 124 may be formed from any solid material suitable for supporting the first LIDAR 120 and/or optically isolating the first LIDAR 120 from the second LIDAR 122. Example materials may include metals, plastics, foam, among other possibilities.

Housing 126 may include a light filter formed from any material that is substantially transparent to light having wavelengths within a wavelength range, and substantially opaque to light having wavelengths outside the wavelength range. For convenience in description, it is noted that the terms "housing 126" and "light filter 126" may be used interchangeably herein to refer to the same physical structure of housing 126 shown in FIG. 1B.

In some examples, light filter 126 may allow light having a first wavelength of light emitted by the first LIDAR 120 (e.g., 905 nm) and a second wavelength of light emitted by the second LIDAR 122 (e.g., 1550 nm) to propagate through light filter 126. As shown, the light filter 126 is shaped to enclose the first LIDAR 120 and the second LIDAR 122. Further, in some examples, light filter 126 may prevent environmental damage to first LIDAR 120 and second LIDAR 122, such as accumulation of dust or collision with airborne debris among other possibilities. In some examples, light filter 126 may be configured to reduce visible light propagating through the light filter 126. In turn, light filter 126 may improve an aesthetic appearance of vehicle 100 by enclosing first LIDAR 120 and second LIDAR 122, while reducing visibility of components of sensor unit 102 from view of an outside observer, for example. In other examples, light filter 126 may be configured to allow visible light as well as the light from the first LIDAR 120 and the second LIDAR 122.

In some embodiments, portions of light filter 126 may be configured to allow different wavelength ranges to propagate through the light filter 126. For example, an upper portion of the light filter 126 (e.g., above dividing structure 124) may be configured to allow propagation of light within a first wavelength range that includes the first wavelength of the first LIDAR 120, and a lower portion of light filter 126 (e.g., below dividing structure 124) may be configured to allow propagation of light within a second wavelength range that includes the second wavelength of the second LIDAR 122. In other embodiments, the wavelength range associated with light filter 126 may include both the first wavelength of the first LIDAR 120 and the second wavelength of the second LIDAR 122.

Figure 1C:
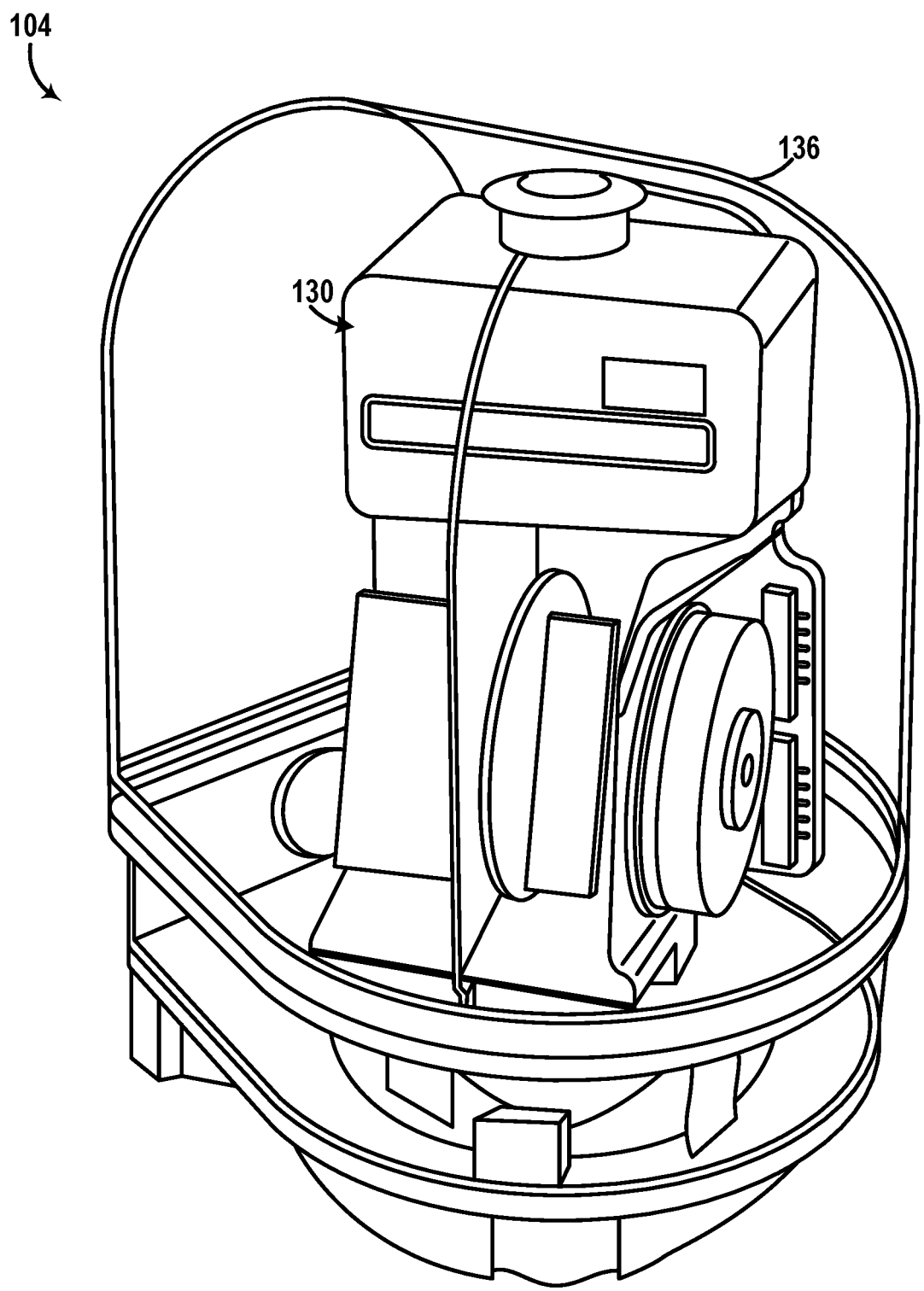
FIG. 1C is a perspective view of a sensor unit positioned at a front side of the vehicle shown in FIG. 1A, according to an example embodiment.

FIG. 1C is a perspective view of the sensor unit 104 positioned at the front side of the vehicle 100 shown in FIG. 1A. In some examples, sensor units 106, 108, and 110 may be configured similarly to sensor unit 104 illustrated in FIG. 1C. As shown, sensor unit 104 includes a third LIDAR 130 and a housing 136. As noted above, sensor unit 104 may additionally or alternatively include other sensors than those shown in FIG. 1C. However, for the sake of example, sensor unit 104 includes the components shown in FIG. 1C.

In some examples, third LIDAR 130 may be configured to scan a FOV of the environment around the vehicle 100 that extends away from a given side of the vehicle 100 (i.e., the front side) where the third LIDAR 130 is positioned. In one example, third LIDAR 130 may be configured to rotate (e.g., horizontally) across a wider FOV than second LIDAR 122 but less than the 360-degree FOV of first LIDAR 120. In one embodiment, third LIDAR 130 may have a FOV of 270° (horizontal)×110° (vertical), a refresh rate of 4 Hz, and may emit a laser beam having a wavelength of 905 nm. In this embodiment, the 3D map determined based on the data from the third LIDAR 130 may have an angular resolution of 1.2° (horizontal)×0.2° (vertical), thereby allowing detection/identification of objects within a (short) range of 30 meters to the vehicle 100. However, other configurations (e.g., number of light sources, angular resolution, wavelength, range, etc.) are possible as well.

Housing 136 may be similar to housing 126 of FIG. 1B. For example, housing 136 may include a light filter shaped to enclose the third LIDAR 130. Further, for example, housing 136 may be configured to allow light within a wavelength range that includes the wavelength of light emitted by the third LIDAR 130 to propagate through housing 136.

As noted above, sensor units 102-110 of vehicle 100 may alternatively or additionally include different types of sensors (e.g., RADARs, cameras, etc.) and may be mounted in different positions inside or outside vehicle 100.

Figure 1D:
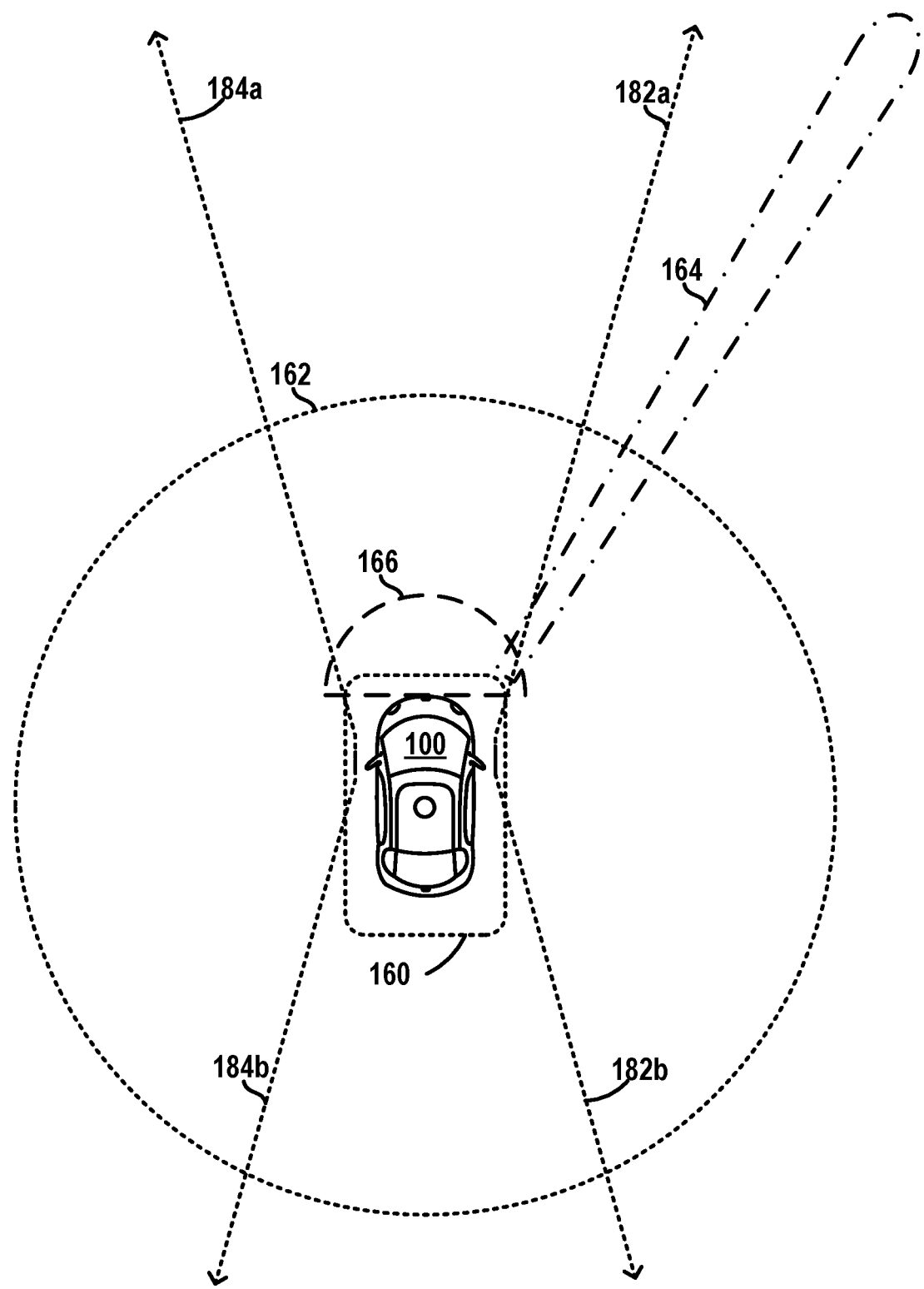
FIG. 1D illustrates in a top view the vehicle shown in FIG. 1A scanning a surrounding environment, according to an example embodiment.

FIG. 1D illustrates a top view of vehicle 100 in a scenario where vehicle 100 is scanning a surrounding environment. In line with the discussion above, each of the various sensors of vehicle 100 may have a particular resolution according to its respective refresh rate, FOV, or any other factor. In turn, the various sensors may be suitable for detection and/or identification of objects within a respective scanning range of distances from vehicle 100.

As shown in FIG. 1D, contours 160 and 162 illustrate an example range of distances to the vehicle 100 where objects may be detected/identified based on data from the first LIDAR 120 of sensor unit 102. As illustrated, for example, close objects within contour 160 may not be properly detected and/or identified due to the positioning of sensor unit 102 on the top side of vehicle 100. However, for example, objects outside of contour 160 and within a medium range of distances (e.g., 100 meters, etc.) defined by the contour 162 may be properly detected/identified using the data from the first LIDAR 120. Further, as shown, the horizontal FOV of the first LIDAR 120 may span 360° in all directions around the vehicle 100.

In the scenario shown, contour 164 may illustrate a region of the environment where objects may be detected and/or identified using the higher resolution data from the second LIDAR 122 of sensor unit 102. As shown, contour 164 may encompass objects further away from vehicle 100 than contour 162, within a longer range of distances (e.g., 300 meters, etc.), for example. Although contour 164 indicates a narrower FOV (horizontally) of second LIDAR 122, in some examples, vehicle 100 may be configured to adjust the viewing direction of second LIDAR 122 to any other direction than that shown in FIG. 1D. For instance, vehicle 100 may detect an object using the data from the first LIDAR 120 (e.g., within the contour 162), adjust the viewing direction of the second LIDAR 122 to a FOV that includes the object, and then identify the object using the higher resolution data from the second LIDAR 122. In one embodiment, the horizontal FOV of the second LIDAR 122 may be 8°.

Further, as shown in FIG. 1D, contour 166 may illustrate a region of the environment scanned by the third LIDAR 130 of sensor unit 104. As shown, the region illustrated by contour 166 includes portions of the environment that may not be scanned by the first LIDAR 120 and/or the second LIDAR 122, for example. Further, for example, data from the third LIDAR 130 may have a resolution sufficient to detect and/or identify objects within a short distance (e.g., 30 meters, etc.) to vehicle 100.

It is noted that the scanning ranges, resolutions, and FOVs described above are for exemplary purposes only, and may vary according to various configurations of vehicle 100. Further, the contours 160-166 shown in FIG. 1D are not necessarily to scale but are illustrated as shown for convenience of description.

Additionally, as noted above, vehicle 100 may include multiple types of sensors such as LIDARs, RADARs, sonars, ultrasound sensors, and/or cameras, among others. Further, for example, various sensors may be suitable for detection and/or identification of objects within respective FOVs of the respective sensors.

To that end, arrows 182a and 182b may illustrate a region of the environment defined by a FOV of a sensor mounted along a side of the vehicle 100, such as a sensor in the sensor unit 108 of FIG. 1A or any other sensor. For example, the sensor associated with the arrows 182a and 182b may be a RADAR sensor that is configured to scan a portion of the environment that extends away from vehicle 100 between arrows 182a and 182b. Additionally or alternatively, in some examples, the sensor associated with the arrows 182a and 182b may include any other type of sensor (e.g., SONAR, camera, etc.). However, for the sake of example, arrows 182a and 182b are described herein as the extents of a FOV of a RADAR sensor. In this example, the RADAR sensor may be configured to detect objects (within the region of the environment between arrows 182a and 182b) that have at least a threshold RADAR cross-section. In one embodiment, the threshold RADAR cross-section may relate to dimensions of a motorcycle, scooter, car, and/or any other vehicle (e.g., 0.5 square meters, etc.). Other example threshold RADAR cross-section values are possible as well.

Similarly, arrows 184a and 184b may illustrate a region of the environment that is within a FOV of another sensor (e.g., another RADAR) mounted along an opposite side of vehicle 100, such as a sensor in the sensor unit 110 of FIG. 1A, for example.

It is noted that the angles between the arrows 182a, 182b and/or 184a, 184b shown in FIG. 1D are not to scale and are for illustrative purposes only. Thus, in some examples, the horizontal FOVs of the sensors in sensor units 108 and 110 may vary as well.

Figure 2:
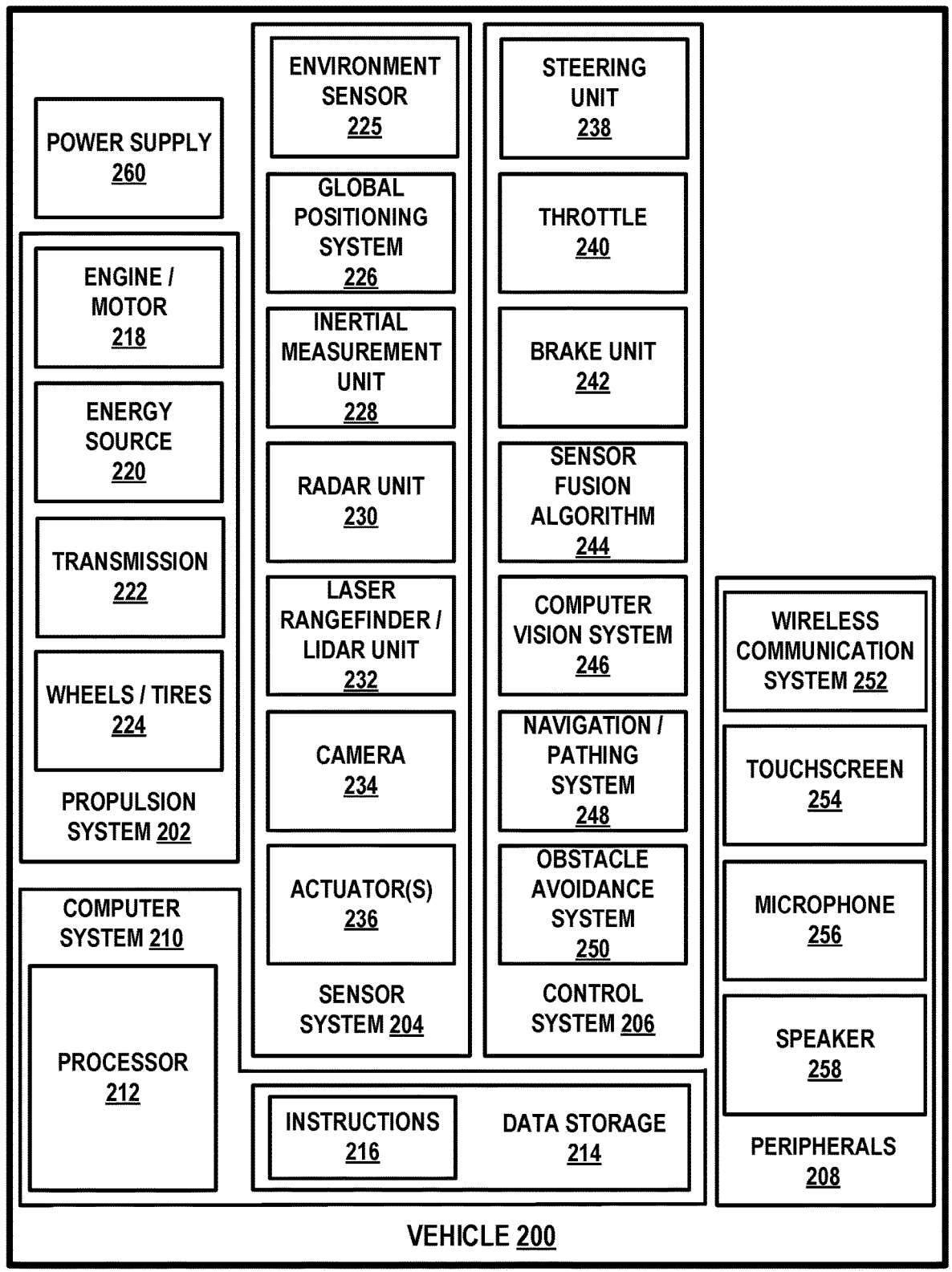
FIG. 2 is a block diagram of a vehicle, according to an example embodiment.

FIG. 2 is a simplified block diagram of a vehicle 200, according to an example embodiment. Vehicle 200 may be similar to vehicle 100, for example. As shown, vehicle 200 includes a propulsion system 202, a sensor system 204, a control system 206, peripherals 208, and a computer system 210. In other embodiments, vehicle 200 may include more, fewer, or different systems, and each system may include more, fewer, or different components. Further, the systems and components shown may be combined or divided in any number of ways.

The propulsion system 202 may be configured to provide powered motion for the vehicle 200. As shown, propulsion system 202 includes an engine/motor 218, an energy source 220, a transmission 222, and wheels/tires 224.

The engine/motor 218 may be or include an internal combustion engine, an electric motor, a steam engine, or a Stirling engine, among other possible types of motors and/or engines. Other motors and engines are possible as well. In some embodiments, the propulsion system 202 may include multiple types of engines and/or motors. For instance, a gas-electric hybrid car may include a gasoline engine and an electric motor. Other examples are possible.

The energy source 220 may be a source of energy that powers the engine/motor 218 in full or in part. That is, the engine/motor 218 may be configured to convert the energy source 220 into mechanical energy. Examples of energy sources 220 include gasoline, diesel, propane, other compressed gas-based fuels, ethanol, solar panels, batteries, and other sources of electrical power. The energy source(s) 220 may additionally or alternatively include any combination of fuel tanks, batteries, capacitors, and/or flywheels. In some embodiments, the energy source 220 may provide energy for other systems of the vehicle 200 as well.

The transmission 222 may be configured to transmit mechanical power from the engine/motor 218 to the wheels/tires 224. To this end, the transmission 222 may include a gearbox, clutch, differential, drive shafts, and/or other elements. In embodiments where the transmission 222 includes drive shafts, the drive shafts may include one or more axles that are configured to be coupled to the wheels/tires 224.

The wheels/tires 224 of vehicle 200 may be configured in various formats, including a unicycle, bicycle/motorcycle, tricycle, or car/truck four-wheel format. Other wheel/tire formats are possible as well, such as those including six or more wheels. In any case, the wheels/tires 224 may be configured to rotate differentially with respect to other wheels/tires 224. In some embodiments, the wheels/tires 224 may include at least one wheel that is fixedly attached to the transmission 222 and at least one tire coupled to a rim of the wheel that could make contact with the driving surface. The wheels/tires 224 may include any combination of metal and rubber, or combination of other materials. The propulsion system 202 may additionally or alternatively include components other than those shown.

The sensor system 204 may include a number of sensors configured to sense information about an environment in which the vehicle 200 is located, as well as one or more actuators 236 configured to modify a position and/or orientation of the sensors. As shown, the sensors of the sensor system 204 include an Environment Sensor 225, Global Positioning System (GPS) 226, an inertial measurement unit (IMU) 228, a RADAR unit 230, a laser rangefinder and/or LIDAR unit 232, and a camera 234. The sensor system 204 may include additional sensors as well, including, for example, sensors that monitor internal systems of the vehicle 200 (e.g., an $O_2$ monitor, a fuel gauge, an engine oil temperature, etc.), range sensors (e.g., sonars, ultrasonic sensors, etc.), among other possibilities. Further, the sensor system 204 may include multiple LIDARs. In some examples, the sensor system 204 may be implemented as multiple sensor units each mounted to the vehicle in a respective position (e.g., top side, bottom side, front side, back side, right side, left side, etc.). Other sensors are possible as well.

The environment sensor 225 may include any type of sensor (e.g. temperature sensor, humidity sensor, etc.) that measures a condition of an environment of vehicle 200. For example, environment sensor 225 may include a temperature sensor, such as a thermocouple, thermistor, thermostat, resistive temperature detector, or any other type of temperature sensor configured to provide a measurement of a temperature of an environment of the vehicle 200.

The GPS 226 may be any sensor (e.g., location sensor) configured to estimate a geographic location of the vehicle 200. To this end, the GPS 226 may include a transceiver configured to estimate a position of the vehicle 200 with respect to the Earth. The GPS 226 may take other forms as well.

The IMU 228 may be any combination of sensors configured to sense position and orientation changes of the vehicle 200 based on inertial acceleration. In some embodiments, the combination of sensors may include, for example, accelerometers and gyroscopes. Other combinations of sensors are possible as well.

The RADAR unit 230 may be any sensor configured to sense objects in the environment in which the vehicle 200 is located using radio signals. In some embodiments, in addition to sensing the objects, the RADAR unit 230 may additionally be configured to sense the speed and/or heading of the objects.

Similarly, the laser range finder or LIDAR unit 232 may be any sensor configured to sense objects in the environment in which the vehicle 200 is located using lasers. In particular, the laser rangefinder or LIDAR unit 232 may include a laser source and/or laser scanner configured to emit a laser and a detector configured to detect reflections of the laser. The laser rangefinder or LIDAR 232 may be configured to operate in a coherent (e.g., using heterodyne detection) or an incoherent detection mode. In some examples, the LIDAR unit 232 may include multiple LIDARs that each have a unique position and/or configuration suitable for scanning a particular region of an environment around the vehicle 200.

The camera 234 may be any camera (e.g., a still camera, a video camera, etc.) configured to capture images of the environment in which the vehicle 200 is located. To this end, the camera may take any of the forms described above. The sensor system 204 may additionally or alternatively include components other than those shown.

The control system 206 may be configured to control operation of the vehicle 200 and its components. To this end, the control system 206 may include a steering unit 238, a throttle 240, a brake unit 242, a sensor fusion algorithm 244, a computer vision system 246, a navigation or pathing system 248, and an obstacle avoidance system 250.

The steering unit 238 may be any combination of mechanisms configured to adjust the heading of vehicle 200. The throttle 240 may be any combination of mechanisms configured to control the operating speed of the engine/motor 218 and, in turn, the speed of the vehicle 200. The brake unit 242 may be any combination of mechanisms configured to decelerate the vehicle 200. For example, the brake unit 242 may use friction to slow the wheels/tires 224. As another example, the brake unit 242 may convert the kinetic energy of the wheels/tires 224 to electric current. The brake unit 242 may take other forms as well.

The sensor fusion algorithm 244 may be an algorithm (or a computer program product storing an algorithm) configured to accept data from the sensor system 204 as an input. The data may include, for example, data representing information sensed at the sensors of the sensor system 204. The sensor fusion algorithm 244 may include, for example, a Kalman filter, a Bayesian network, an algorithm for some of the functions of the methods herein, or any another algorithm. The sensor fusion algorithm 244 may further be configured to provide various assessments based on the data from the sensor system 204, including, for example, evaluations of individual objects and/or features in the environment in which the vehicle 100 is located, evaluations of particular situations, and/or evaluations of possible impacts based on particular situations. Other assessments are possible as well.

The computer vision system 246 may be any system configured to process and analyze images captured by the camera 234 in order to identify objects and/or features in the environment in which the vehicle 200 is located, including, for example, traffic signals and obstacles. To this end, the computer vision system 246 may use an object recognition algorithm, a Structure from Motion (SFM) algorithm, video tracking, or other computer vision techniques. In some embodiments, the computer vision system 246 may additionally be configured to map the environment, track objects, estimate the speed of objects, etc.

The navigation and pathing system 248 may be any system configured to determine a driving path for the vehicle 200. The navigation and pathing system 248 may additionally be configured to update the driving path dynamically while the vehicle 200 is in operation. In some embodiments, the navigation and pathing system 248 may be configured to incorporate data from the sensor fusion algorithm 244, the GPS 226, the LIDAR unit 232, and one or more predetermined maps so as to determine the driving path for vehicle 200.

The obstacle avoidance system 250 may be any system configured to identify, evaluate, and avoid or otherwise negotiate obstacles in the environment in which the vehicle 200 is located. The control system 206 may additionally or alternatively include components other than those shown.

Peripherals 208 may be configured to allow the vehicle 200 to interact with external sensors, other vehicles, external computing devices, and/or a user. To this end, the peripherals 208 may include, for example, a wireless communication system 252, a touchscreen 254, a microphone 256, and/or a speaker 258.

The wireless communication system 252 may be any system configured to wirelessly couple to one or more other vehicles, sensors, or other entities, either directly or via a communication network. To this end, the wireless communication system 252 may include an antenna and a chipset for communicating with the other vehicles, sensors, servers, or other entities either directly or via a communication network. The chipset or wireless communication system 252 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 252 may take other forms as well.

The touchscreen 254 may be used by a user to input commands to the vehicle 200. To this end, the touchscreen 254 may be configured to sense at least one of a position and a movement of a user's finger via capacitive sensing, resistance sensing, or a surface acoustic wave process, among other possibilities. The touchscreen 254 may be capable of sensing finger movement in a direction parallel or planar to the touchscreen surface, in a direction normal to the touchscreen surface, or both, and may also be capable of sensing a level of pressure applied to the touchscreen surface. The touchscreen 254 may be formed of one or more translucent or transparent insulating layers and one or more translucent or transparent conducting layers. The touchscreen 254 may take other forms as well.

The microphone 256 may be configured to receive audio (e.g., a voice command or other audio input) from a user of the vehicle 200. Similarly, the speakers 258 may be configured to output audio to the user of the vehicle 200. The peripherals 208 may additionally or alternatively include components other than those shown.

The computer system 210 may be configured to transmit data to, receive data from, interact with, and/or control one or more of the propulsion system 202, the sensor system 204, the control system 206, and the peripherals 208. To this end, the computer system 210 may be communicatively linked to one or more of the propulsion system 202, the sensor system 204, the control system 206, and the peripherals 208 by a system bus, network, and/or other connection mechanism (not shown).

In one example, the computer system 210 may be configured to control operation of the transmission 222 to improve fuel efficiency. As another example, the computer system 210 may be configured to cause the camera 234 to capture images of the environment. As yet another example, the computer system 210 may be configured to store and execute instructions corresponding to the sensor fusion algorithm 244. As still another example, the computer system 210 may be configured to store and execute instructions for determining a 3D representation of the environment around the vehicle 200 using the LIDAR unit 232. Other examples are possible.

As shown, the computer system 210 includes the processor 212 and data storage 214. The processor 212 may comprise one or more general-purpose processors and/or one or more special-purpose processors. To the extent the processor 212 includes more than one processor, such processors could work separately or in combination. Data storage 214, in turn, may comprise one or more volatile and/or one or more non-volatile storage components, such as optical, magnetic, and/or organic storage, and data storage 214 may be integrated in whole or in part with the processor 212.

In some embodiments, data storage 214 may contain instructions 216 (e.g., program logic) executable by the processor 212 to execute various vehicle functions (e.g., method 400 illustrated in FIG. 4 and described below). Data storage 214 may contain additional instructions as well, including instructions to transmit data to, receive data from, interact with, and/or control one or more of the propulsion system 202, the sensor system 204, the control system 206, and/or the peripherals 208. The computer system 210 may additionally or alternatively include components other than those shown.

As shown, the vehicle 200 further includes a power supply 260, which may be configured to provide power to some or all of the components of the vehicle 200. To this end, the power supply 260 may include, for example, a rechargeable lithium-ion or lead-acid battery. In some embodiments, one or more banks of batteries could be configured to provide electrical power. Other power supply materials and configurations are possible as well. In some embodiments, the power supply 260 and energy source 220 may be implemented together as one component, as in some all-electric cars.

In some embodiments, the vehicle 200 may include one or more elements in addition to or instead of those shown. For example, the vehicle 200 may include one or more additional interfaces and/or power supplies. Other additional components are possible as well. In such embodiments, data storage 214 may further include instructions executable by the processor 212 to control and/or communicate with the additional components.

Still further, while FIG. 2 shows the components and systems as integrated in the vehicle 200, in some embodiments, one or more components or systems may be removably mounted on or otherwise connected (mechanically or electrically) to the vehicle 200 using wired or wireless connections. In one example, a portion of the computing system 210 that determines operation instructions for one or more of the sensors in the sensor system 204 may be disposed outside the vehicle 200 (e.g., in a remote server, etc.) that is in communication with the vehicle 200 via a wireless communication interface (e.g., wireless communication system 252, etc.). The vehicle 200 may take other forms as well.

Figure 3:
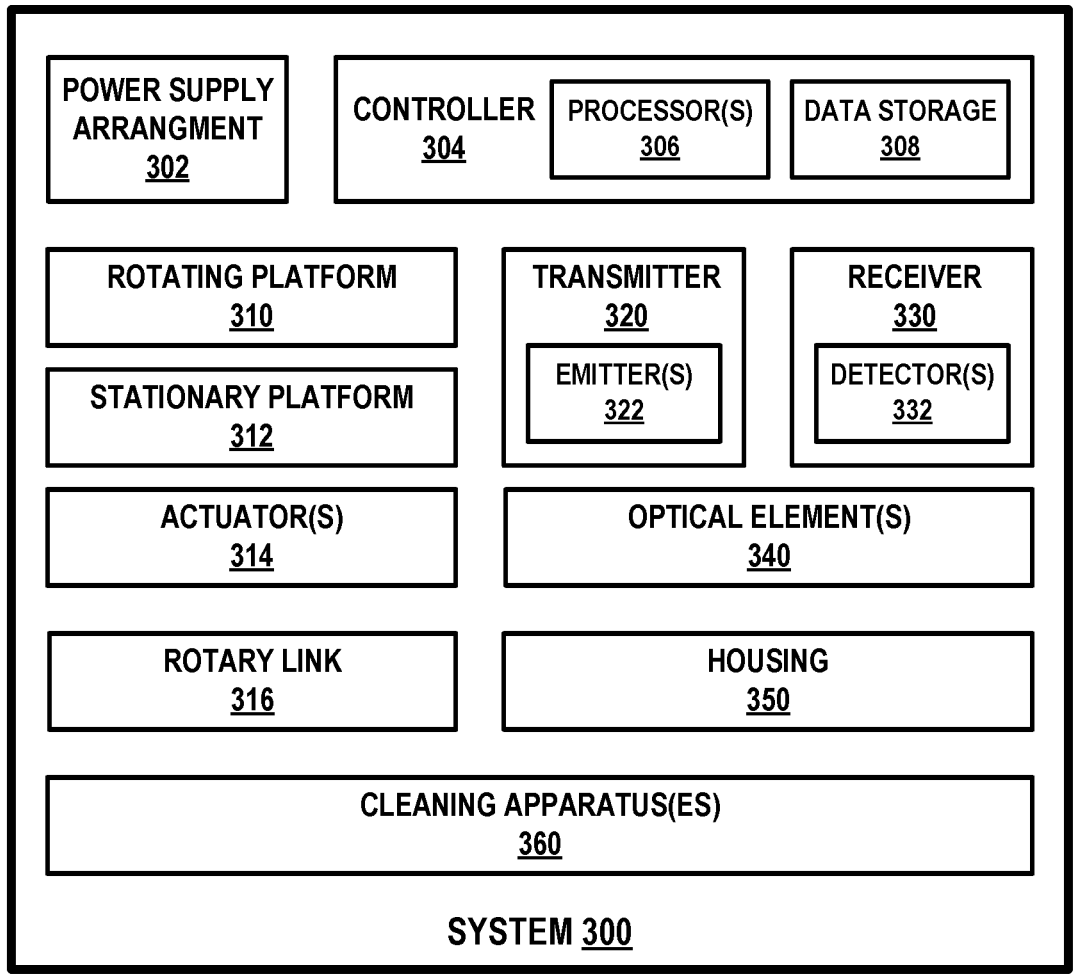
FIG. 3 is a block diagram of a system, according to an example embodiment.

FIG. 3 is a simplified block diagram of a system 300, according to example embodiments. As shown, system 300 includes a power supply arrangement 302, a controller 304, a rotating platform 310, a stationary platform 312, one or more actuators 314, a rotary link 316, a transmitter 320, a receiver 330, one or more optical elements 340, a housing 350, and one or more cleaning apparatuses 360. In some embodiments, system 300 may include more, fewer, or different components. Additionally, the components shown may be combined or divided in any number of ways.

Power supply arrangement 302 may be configured to supply, receive, and/or distribute power to various components of system 300. To that end, power supply arrangement 302 may include or otherwise take the form of a power source (e.g., battery cells, etc.) disposed within system 300 and connected to various components of the system 300 in any feasible manner, so as to supply power to those components. Additionally or alternatively, power supply arrangement 302 may include or otherwise take the form of a power adapter configured to receive power from one or more external power sources (e.g., from a power source arranged in a vehicle to which system 300 is mounted) and to transmit the received power to various components of system 300.

Controller 304 may include one or more electronic components and/or systems arranged to facilitate certain operations of system 300. Controller 304 may be disposed within system 300 in any feasible manner. In one embodiment, controller 304 may be disposed, at least partially, within a central cavity region of rotary link 316.

In some examples, controller 304 may include or otherwise be coupled to wiring used for transfer of control signals to various components of system 300 and/or for transfer of data from various components of system 300 to controller 304. For example, the data that controller 304 receives may include sensor data indicating detections of signals by receiver 330, among other possibilities. Moreover, the control signals sent by controller 304 may operate various components of system 300, such as by controlling emission of signals by transmitter 320, controlling detection of signals by the receiver 330, and/or controlling actuator(s) 314 to rotate rotating platform 310, among other possibilities.

As shown, controller 304 may include one or more processors 306 and data storage 108. In some examples, data storage 108 may store program instructions executable by processor(s) 306 to cause system 300 to perform the various operations described herein. To that end, processor(s) 306 may comprise one or more general-purpose processors and/ or one or more special-purpose processors. To the extent that controller 304 includes more than one processor, such processors could work separately or in combination. In some examples, data storage 108 may comprise one or more volatile and/or one or more non-volatile storage components, such as optical, magnetic, and/or organic storage, and data storage 108 may be optionally integrated in whole or in part with the processor(s).

In some examples, controller 304 may communicate with an external controller or the like (e.g., a computing system arranged in a vehicle to which system 300 is mounted) so as to help facilitate transfer of control signals and/or data between the external controller and the various components of system 300. Additionally or alternatively, in some examples, controller 304 may include circuitry wired to perform one or more of the operations described herein. For example, controller 304 may include one or more pulser circuits that provide pulse timing signals for triggering emission of pulses or other signals by transmitter 320. Additionally or alternatively, in some examples, controller 304 may include one or more special purpose processors, servos, or other types of controllers. For example, controller 304 may include a proportional-integral-derivative (PID) controller or other control loop feedback mechanism that operates actuator(s) 314 to cause the rotating platform to rotate at a particular frequency or phase. Other examples are possible as well.

Rotating platform 310 may be configured to rotate about an axis. To that end, rotating platform 310 can be formed from any solid material suitable for supporting one or more components mounted thereon. For example, transmitter 320 and receiver 330 may be arranged on rotating platform 310 such that each of these components moves relative to the environment based on rotation of rotating platform 310. In particular, these components could be rotated about an axis so that system 300 may obtain information from various directions. For instance, where the axis of rotation is a vertical axis, a pointing direction of system 300 can be adjusted horizontally by actuating the rotating platform 310 about the vertical axis.

Stationary platform 312 may take on any shape or form and may be configured for coupling to various structures, such as to a top of a vehicle, a robotic platform, assembly line machine, or any other system that employs system 300 to scan its surrounding environment, for example. Also, the coupling of the stationary platform may be carried out via any feasible connector arrangement (e.g., bolts, screws, etc.).

Actuator(s) 314 may include motors, pneumatic actuators, hydraulic pistons, and/or piezoelectric actuators, and/or any other types of actuators. In one example, actuator(s) 314 may include a first actuator configured to actuate the rotating platform 310 about the axis of rotation of rotating platform 310. In another example, actuator(s) 314 may include a second actuator configured to rotate one or more components of system 300 about a different axis of rotation. For instance, the second actuator may rotate an optical element (e.g., mirror, etc.) about a second axis (e.g., horizontal axis, etc.) to adjust a direction of an emitted light pulse (e.g., vertically, etc.). In yet another example, actuator(s) 314 may include a third actuator configured to tilt (or otherwise move) one or more components of system 300. For instance, the third actuator can be used to move or replace a filter or other type of optical element 340 along an optical path of an emitted light pulse, or can be used to tilt rotating platform (e.g., to adjust the extents of a field-of-view (FOV) scanned by system 300, etc.), among other possibilities.

Rotary link 316 directly or indirectly couples stationary platform 312 to rotating platform 310. To that end, rotary link 316 may take on any shape, form and material that provides for rotation of rotating platform 310 about an axis relative to the stationary platform 312. For instance, rotary link 316 may take the form of a shaft or the like that rotates based on actuation from actuator(s) 314, thereby transferring mechanical forces from actuator(s) 314 to rotating platform 310. In one implementation, rotary link 316 may have a central cavity in which one or more components of system 300 may be disposed. In some examples, rotary link 316 may also provide a communication link for transferring data and/or instructions between stationary platform 312 and rotating platform 310 (and/or components thereon such as transmitter 320 and receiver 330).

Transmitter 320 may be configured to transmit signals toward an environment of system 300. As shown, transmitter 320 may include one or more emitters 322. Emitters 322 may include various types of emitters depending on a configuration of system 300.

In a first example, where system 300 is configured as a LIDAR device, transmitter 320 may include one or more light emitters 322 that emit one or more light beams and/or pulses having wavelengths within a wavelength range. The wavelength range could be, for example, in the ultraviolet, visible, and/or infrared portions of the electromagnetic spectrum. In some examples, the wavelength range can be a narrow wavelength range, such as that provided by lasers. A non-exhaustive list of example light emitters 322 includes laser diodes, diode bars, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), fiber lasers, and/or any other device configured to selectively transmit, reflect, and/or emit light to provide a plurality of emitted light beams and/or pulses.

In a second example, where system 300 is configured as an active infrared (IR) camera, transmitter 320 may include one or more emitters 322 configured to emit IR radiation to illuminate a scene. To that end, transmitter 320 may include any type of emitter (e.g., light source, etc.) configured to provide the IR radiation.

In some implementations, system 300 (and/or transmitter 320) can be configured to emit a plurality of signals (e.g., light beams, IR signals, etc.) in a relative spatial arrangement that defines a FOV of system 300. For example, each beam (or signal) may be configured to propagate toward a portion of the FOV. In this example, multiple adjacent (and/or partially overlapping) beams may be directed to scan multiple respective portions of the FOV during a scan operation performed by system 300. Other examples are possible as well.

Receiver 330 may include one or more detectors 332 configured to detect reflections of the signals emitted by transmitter 320.

In a first example, where system 300 is configured as an active IR camera, receiver 330 may include one or more light detectors 332 (e.g., charge-coupled devices (CCDs), etc.) that are configured to detect a source wavelength of IR light transmitted by transmitter 320 and reflected off a scene toward receiver 330.

In a second example, where system 300 is configured as a LIDAR device, receiver 330 may include one or more light detectors 332 arranged to intercept and detect reflections of the light pulses or beams emitted by transmitter 320 that return to system 300 from the environment. Example light detectors 332 may include photodiodes, avalanche photodiodes (APDs), silicon photomultipliers (SiPMs), single photon avalanche diodes (SPADs), multi-pixel photon counters (MPPCs), phototransistors, cameras, active pixel sensors (APS), charge coupled devices (CCD), cryogenic detectors, and/or any other sensor of light. In some instances, receiver 330 may be configured to detect light having wavelengths in the same wavelength range as the light emitted by transmitter 320. In this way, for instance, system 300 may distinguish received light originated by system 300 from other light originated by external sources in the environment.

In some implementations, receiver 330 may include a detector comprising an array of sensing elements connected to one another. For instance, where system 300 is configured as a LIDAR device, multiple light sensing elements could be connected in parallel to provide a photodetector array having a larger light detection area (e.g., combination of the sensing surfaces of the individual detectors in the array, etc.) than a detection area of a single sensing element. The photodetector array could be arranged in a variety of ways. For instance, the individual detectors of the array can be disposed on one or more substrates (e.g., printed circuit boards (PCBs), flexible PCBs, etc.) and arranged to detect incoming light that is traveling along an optical path of an optical lens of system 300 (e.g., optical element(s) 340). Also, such a photodetector array could include any feasible number of detectors arranged in any feasible manner.

In some examples, system 300 can select or adjust a horizontal scanning resolution by changing a rate of rotation of system 300 (and/or transmitter 320 and receiver 330). Additionally or alternatively, the horizontal scanning resolution can be modified by adjusting a pulse rate of signals emitted by transmitter 320. In a first example, transmitter 320 may be configured to emit pulses at a pulse rate of 15,650 pulses per second, and to rotate at 10 Hz (i.e., ten complete 360° rotations per second) while emitting the pulses. In this example, receiver 330 may have a 0.23° horizontal angular resolution (e.g., horizontal angular separation between consecutive pulses). In a second example, if system 300 is instead rotated at 20 Hz while maintaining the pulse rate of 15,650 pulses per second, then the horizontal angular resolution may become 0.46°. In a third example, if transmitter 320 emits the pulses at a rate of 31,300 pulses per second while maintaining the rate of rotation of 10 Hz, then the horizontal angular resolution may become 0.115°. In some examples, system 300 can be alternatively configured to scan a particular range of views within less than a complete 360° rotation of system 300. Other implementations are possible as well.

It is noted that the pulse rates, angular resolutions, rates of rotation, and viewing ranges described above are only for the sake of example, and thus each of these scanning characteristics could vary according to various applications of system 300.

Optical elements 340 can be optionally included in or otherwise coupled to transmitter 320, receiver 330, and/or housing 350. In a first example, optical elements 340 may include one or more optical elements arranged to direct light emitted by emitter(s) 322 toward a scene (or a region therein). In a second example, optical elements 340 may include one or more optical elements arranged to focus light from the scene (or a region therein) toward detector(s) 332. In a third example, optical element 340 may include one or more optical elements (e.g., light filters, optical windows, etc.) disposed at housing 350 as an interface for selectively transmitting light signals, through housing 350, from or to a surrounding environment.

As such, optical element(s) 340 may include any feasible combination of optical elements, such as filters, apertures, mirror(s), waveguide(s), lens(es), or other types optical components, that are arranged to guide propagation of light through physical space and/or to adjust a characteristic of the light.

In some examples, controller 304 could operate actuator 314 to rotate rotating platform 310 in various ways so as to obtain information about the environment. In one example, rotating platform 310 could be rotated in either direction. In another example, rotating platform 310 may carry out complete revolutions such that system 300 scans a 360° view of the environment. Moreover, rotating platform 310 could rotate at various frequencies so as to cause system 300 to scan the environment at various refresh rates. In one embodiment, system 300 may be configured to have a refresh rate of 10 Hz (e.g., ten complete rotations of system 300 per second). Other refresh rates are possible.

Alternatively or additionally, system 300 may be configured to adjust the pointing direction of an emitted signal (emitted by transmitter 320) in various ways. In one implementation, signal emitters (e.g., light sources, antennas, acoustic transducers, etc.) of transmitter 320 can be operated according to a phased array configuration, or other type of beam steering configuration (e.g., a specific location within a beam pattern could be nulled, etc.).

In one example, where system 300 is configured as a LIDAR device, light sources or emitters in transmitter 320 can be coupled to phased array optics that control the phase of light waves emitted by the light sources. For instance, controller 304 can be configured to adjust the phased array optics (e.g., phased array beam steering) to change the effective pointing direction of a light signal emitted by transmitter 320 (e.g., even if rotating platform 310 is not rotating).

Housing 350 may take on any shape, form, and material and may be configured to house one or more components of system 300. In some examples, transmitter 320, receiver 330, and possibly other components of system 300 may each be disposed within housing 350. In some examples, housing 350 can be a dome-shaped housing. In some examples, housing may be formed from a light filtering material that is at least partially transparent to wavelengths of light transmitted by transmitter 320. In other examples, portions of housing 350 may be composed of or may include a material that is non-transparent to these wavelengths. In some examples, housing 350 may be configured to prevent at least some signals from entering the interior space of the housing 350 and thus help mitigate thermal and noise effects of ambient signals on one or more components of system 300. Other configurations of housing 350 are possible as well.

In some examples, housing 350 may be coupled to rotating platform 310 such that housing 350 is configured to rotate based on rotation of rotating platform 310. In this manner, transmitter 320 and receiver 330 may rotate along with housing 350 while being disposed within housing 350. In other examples, housing 350 may be coupled to stationary platform 312 or other structure such that housing 350 does not rotate with the other components rotated by rotating platform 310. Thus, for instance, light pulses emitted from transmitter 320 may propagate toward different sections of housing 350 and in different directions toward the environment as rotating platform 310 rotates about its axis.

Cleaning apparatus(es) 360 can be optionally included in system 300 to facilitate cleaning one or more components (e.g., optical element(s) 340, etc.) of system 300. To that end, cleaning apparatus 360 may include one or more cleaning mechanisms. A first example cleaning apparatus 360 may include a liquid spray configured to deposit liquid on one or more components of system 300 (e.g., optical element(s) 340, housing 350, etc.). For instance, the liquid can be applied to attempt dissolving or mechanically removing an occlusion (e.g., dirt, dust, etc.) disposed on a surface of an optical component. A second example cleaning apparatus 360 may include a high-pressure gas pump configured to apply gas onto an occlusion on a surface of an optical component. A third example cleaning apparatus 360 may include a wiper (e.g., similar to a windshield wiper) configured to attempt removing an occlusion from a surface of a component in system 300. Other examples are possible.

It is noted that this arrangement of system 300 is described for exemplary purposes only and is not meant to be limiting. As noted above, in some examples, system 300 can be alternatively implemented with fewer components than those shown. In one example, system 300 can be implemented without rotating platform 300. For instance, transmitter 320 can be configured to transmit a plurality of signals spatially arranged to define a particular FOV of system 300 (e.g., horizontally and vertically) without necessarily rotating transmitter 320 and receiver 330. In another example, emitted light pulses from transmitter 320 can be steered in different directions by using a different type of beam-steering optical arrangement (e.g., rotating mirror, etc.). Other examples are possible as well.

Figure 4A:
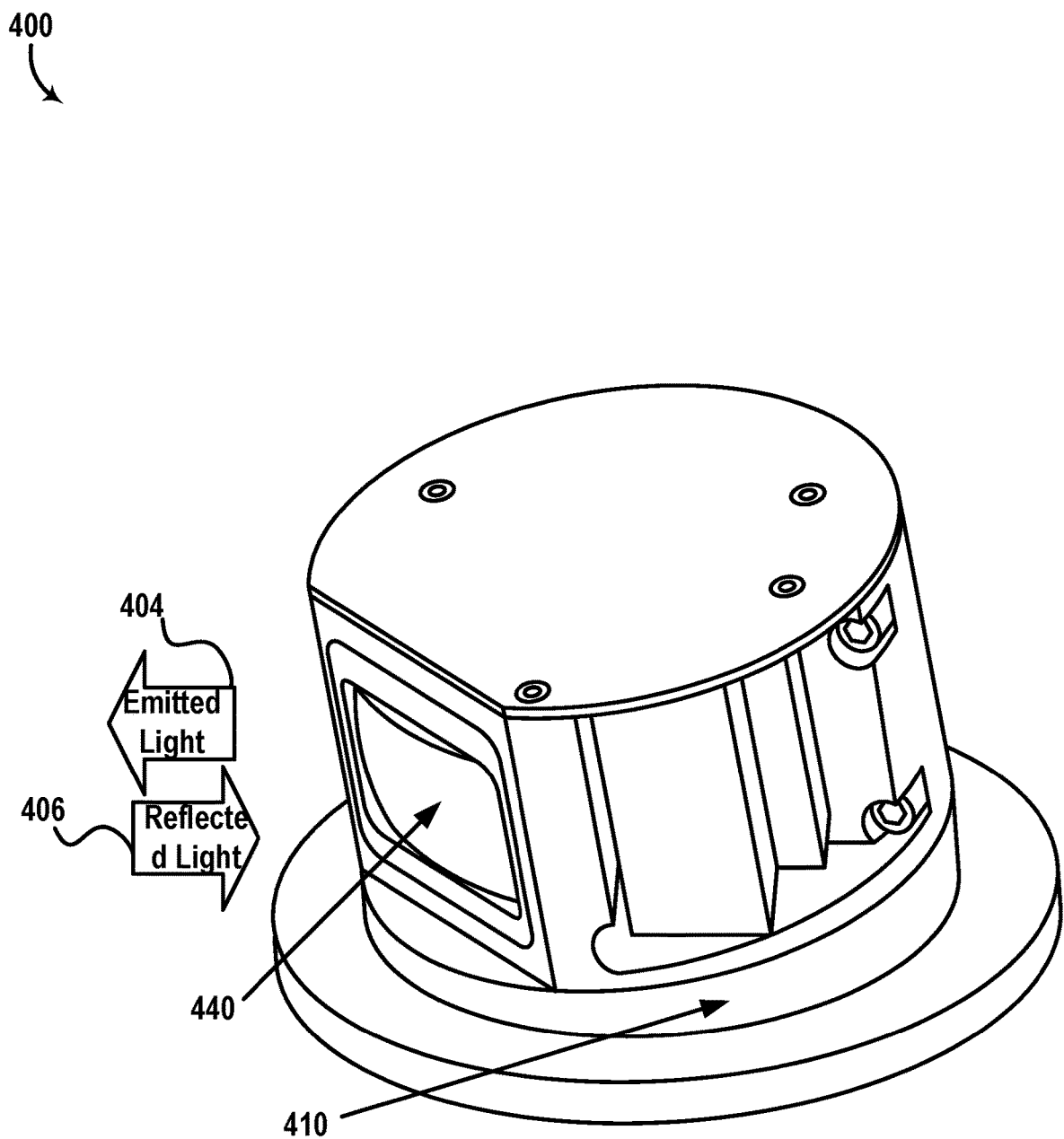
FIG. 4A illustrates a LIDAR device, according to an example embodiment.

FIG. 4A illustrates a LIDAR device 400, according to an example embodiment. As shown, the LIDAR 400 includes a lens 440, and a platform 410. Additionally, light beams 404 emitted by the LIDAR 400 propagate from the lens 440 along a viewing direction of the first LIDAR 400 toward an environment of the LIDAR 400, and reflect off one or more objects in the environment as reflected light 406.

Although not shown, LIDAR 400 may also include a housing similar to housing 126 shown in FIG. 1B, housing 136 shown in FIG. 1C, and/or housing 350 of system 300. In one example, LIDAR device 400 may be similar to LIDAR device 120 shown in FIG. 1B, and may be disposed inside housing 126 instead of or in addition to LIDAR device 120. Other examples are possible as well.

In some examples, LIDAR 400 can be configured to have a substantially cylindrical shape and to rotate about an axis of LIDAR 400. In one embodiment, LIDAR 400 has a diameter of approximately ten centimeters. In some examples, the axis of rotation of LIDAR 400 is substantially vertical. By rotating LIDAR 400 about the vertical axis for instance, a three-dimensional map of a 360-degree horizontal field-of-view (FOV) of LIDAR 400 can be determined. Additionally or alternatively, in some examples, the axis of rotation of LIDAR 400 can be tilted to adjust the horizontal FOV.

The lens 440 can have an optical power to both collimate the emitted light beams 404, and focus the reflected light 406 from one or more objects in the environment of the LIDAR 400 onto detectors in the LIDAR 400. By using the same lens 440 to perform both of these functions, instead of a transmit lens for collimating and a receive lens for focusing, advantages with respect to size, cost, and/or complexity can be provided.

In some examples, platform 410 may be configured to rotate about an axis to scan a 360-degree view of the environment surrounding the LIDAR 400. In other examples, platform 410 may be configured to rotate across a range of angles less than a complete 360-degree range. In some examples, platform 410 may comprise a movable platform that may tilt in one or more directions to adjust the axis of rotation of the LIDAR 400.

Figure 4B:
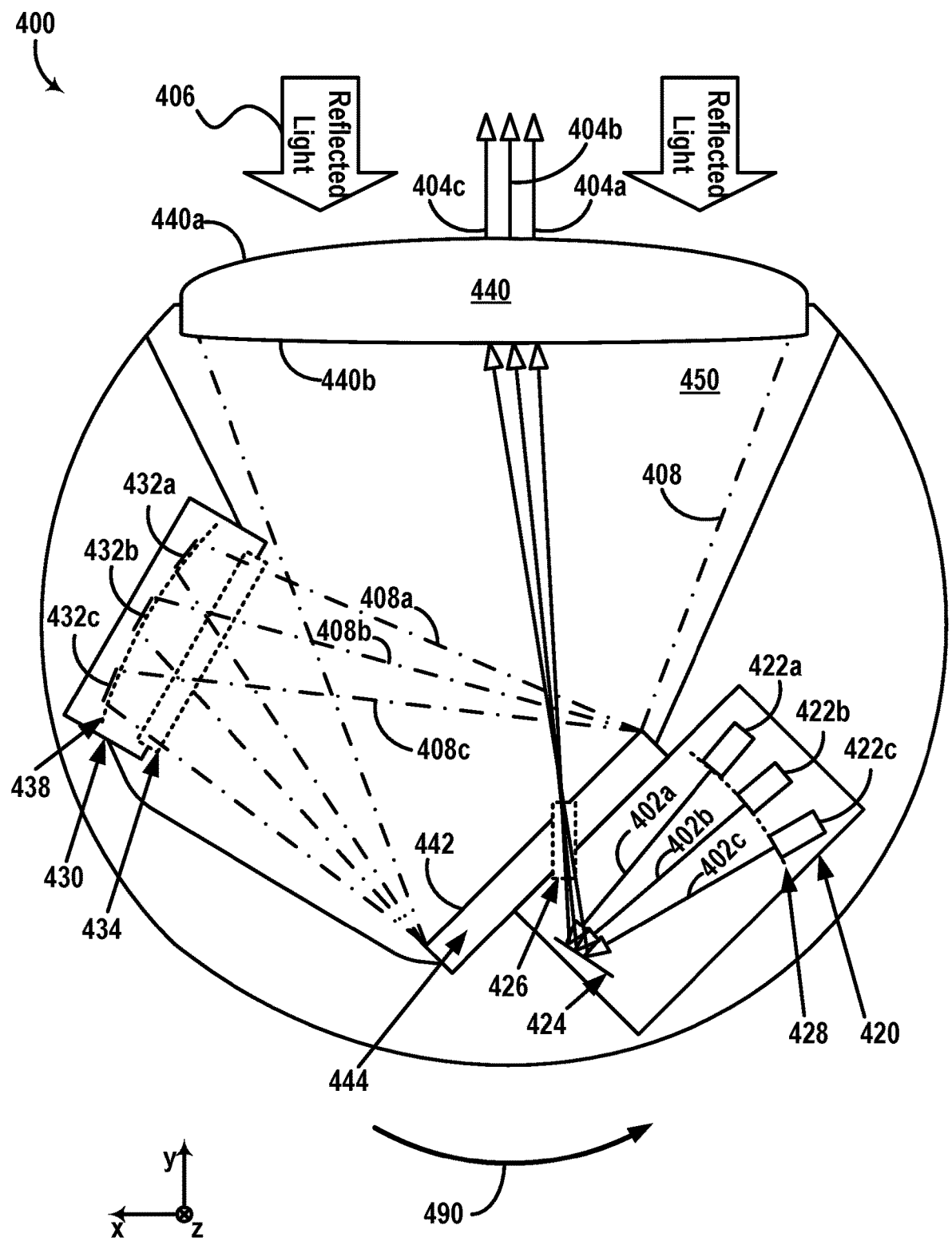
FIG. 4B illustrates a cross-section view of the LIDAR device of FIG. 4A.

FIG. 4B is a cross-section view of the LIDAR 400. As shown, LIDAR 400 includes a transmitter 420, a receiver 430, a shared space 450, and the lens 440. For purposes of illustration, FIG. 4B shows an x-y-z axis, in which the z-axis is pointing out of the page.

The transmitter 420 includes a plurality of light sources 422a-c that may be arranged along a curved focal surface 428 defined by the lens 440. The plurality of light sources 422a-c can be configured to emit, respectively, the plurality of light beams 402a-c having wavelengths within a wavelength range. For example, the plurality of light sources 422a-c may comprise laser diodes that emit the plurality of light beams 402a-c having the wavelengths within the wavelength range. The plurality of light beams 402a-c are reflected by mirror 424 through an exit aperture 426 into the shared space 450 and towards the lens 440.

The light sources 422a-c can include laser diodes, light emitting diodes (LED), laser bars (e.g., diode bars), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 402a-c. In some examples, the light sources 422a-c can be configured to emit the emitted light beams 402a-c in a wavelength range that can be detected by detectors 432a-c included in the receiver 430. The wavelength range could, for example, be in the ultraviolet, visible, and/or infrared portions of the electromagnetic spectrum. In some examples, the wavelength range can be a narrow wavelength range, such as provided by lasers. In one embodiment, the wavelength range includes a source wavelength of 905 nm. Additionally, the light sources 422a-c can be configured to emit the emitted light beams 402a-c in the form of pulses. In some examples, the plurality of light sources 422a-c can be disposed on one or more substrates (e.g., printed circuit boards (PCB), flexible PCBs, etc.) and arranged to emit the plurality of light beams 402a-c towards the exit aperture 426.

Although FIG. 4B shows that the curved focal surface 428 is curved in a horizontal plane (e.g., x-y plane), additionally or alternatively, the light sources 422a-c may be arranged along a focal surface that is curved in a vertical plane. For example, the curved focal surface 428 can have a curvature in a vertical plane, and the plurality of light sources 422a-c can include additional light sources arranged vertically along the curved focal surface 428 and configured to emit light beams directed at the mirror 424 and reflected through the exit aperture 426. In this example, the detectors 432a-c may also include additional detectors that correspond to additional light sources of the light sources 422a-c. Further, in some examples, the light sources 422a-c may include additional light sources arranged horizontally along the curved focal surface 428. In one embodiment, the light sources 422a-c may include 64 light sources that emit light having a wavelength of 905 nm. For instance, the 64 light sources may be arranged in four columns, each comprising 16 light sources, along the curved focal surface 428. In this instance, the detectors 432a-c may include 64 detectors that are arranged similarly (e.g., 4 columns comprising 16 detectors each, etc.) along curved focal surface 438. In other embodiments, the light sources 422a-c and the detectors 432a-c may include additional or fewer light sources and/or detectors than those shown in FIG. 4B.

Due to the arrangement of the plurality of light sources 422a-c along the curved focal surface 428, the plurality of light beams 402a-c, in some examples, may converge towards the exit aperture 426. Thus, in these examples, the exit aperture 426 may be minimally sized while being capable of accommodating vertical and horizontal extents of the plurality of light beams 402a-c. Additionally, in some examples, the curved focal surface 428 can be defined by the lens 440. For example, the curved focal surface 428 may correspond to a focal surface of the lens 440 due to shape and composition of the lens 440. In this example, the plurality of light sources 422a-c can be arranged along the focal surface defined by the lens 440 at the transmitter.

The plurality of light beams 402a-c propagate in a transmit path that extends through the transmitter 420, the exit aperture 426, and the shared space 450 towards the lens 440. The lens 440 may collimate the plurality of light beams 402a-c to provide collimated light beams 404a-c into an environment of the LIDAR device 400. The collimated light beams 404a-c may correspond, respectively, to the plurality of light beams 402a-c. In some examples, the collimated light beams 404a-c reflect off one or more objects in the environment of the LIDAR 400 as reflected light 406. The reflected light 406 may be focused by the lens 440 into the shared space 450 as focused light 408 traveling along a receive path that extends through the shared space 450 toward the receiver 430. For example, the focused light 408 may be reflected by the reflective surface 442 as focused light 408a-c propagating toward the receiver 430.

Thus, the lens 440 may be capable of both collimating the plurality of light beams 402a-c and focusing the reflected light 406 based on the shape and composition of the lens 440. In one embodiment, lens 440 can have an aspheric surface 440a facing outside of LIDAR 400 and a toroidal surface 440b facing the shared space 450. By using the same lens 440 to perform both of these functions, instead of a transmit lens for collimating and a receive lens for focusing, advantages with respect to size, cost, and/or complexity can be provided.

As shown, the exit aperture 426 is included in a wall 444 that separates the transmitter 420 from the shared space 450. In some examples, the wall 444 can be formed from a transparent material (e.g., glass) that is coated with a reflective material 442. In this example, the exit aperture 426 may correspond to the portion of the wall 444 that is not coated by the reflective material 442. Additionally or alternatively, the exit aperture 426 may comprise a hole or cut-away in the wall 444.

The focused light 408 is reflected by the reflective surface 442 and directed toward an entrance aperture 434 of the receiver 430. In some examples, the entrance aperture 434 may comprise a filtering window (e.g., "light filter") configured to transmit wavelengths in the wavelength range of the plurality of light beams 402a-c (e.g., source wavelength) emitted by the plurality of light sources 422a-c and attenuate other wavelengths. In some examples, the entrance aperture 434 may comprise a half-mirror configured to reflect a portion of the focused light 408a-c and allow another portion of the focused light 408a-c to propagate toward the detectors 432a-c. Thus, as shown, at least a portion of the focused light 408a-c propagates toward a plurality of detectors 432a-c.

The plurality of detectors 432a-c can be arranged along a curved focal surface 438 of the receiver 430. Although FIG. 4B shows that the curved focal surface 438 is curved along the x-y plane (horizontal plane), additionally or alternatively, the curved focal surface 438 can be curved in a vertical plane. The curvature of the focal surface 438 may be defined by the lens 440. For example, the curved focal surface 438 may correspond to a focal surface of the light projected by the lens 440 along the receive path at the receiver 430.

The detectors 432a-c may comprise photodiodes, avalanche photodiodes, phototransistors, cameras, active pixel sensors (APS), charge coupled devices (CCD), cryogenic detectors, or any other sensor of light configured to receive focused light 408a-c having wavelengths in the wavelength range of the emitted light beams 402a-c.

Each of the focused light 408a-c may correspond, respectively, to reflections of the emitted light beams 402a-c and is directed toward, respectively, the plurality of detectors 432a-c. For example, the detector 432a is configured and arranged to received focused light 408a that corresponds to collimated light beam 404a reflected off the one or more objects in the environment of the LIDAR 400. In this example, the collimated light beam 404a corresponds to the light beam 402a emitted by the light source 422a. Thus, the detector 432a receives light that was emitted by the light source 422a, the detector 432b receives light that was emitted by the light source 422b, and the detector 432c receives light that was emitted by the light source 422c.

By comparing the received light 408a-c with the emitted light beams 402a-c, at least one aspect of the one or more objects in the environment of the LIDAR 400 may be determined. For example, by comparing a time when the plurality of light beams 402a-c were emitted by the plurality of light sources 422a-c and a time when the plurality of detectors 432a-c received the focused light 408a-c, a distance between the LIDAR 400 and the one or more objects in the environment of the LIDAR 400 may be determined. In some examples, other aspects such as shape, color, material, etc. may also be determined.

In some examples, the LIDAR 400 may be rotated about an axis to determine a three-dimensional map of the surroundings of the LIDAR 400. For example, the LIDAR 400 may be rotated, as illustrated by arrow 490, about an axis that points out of the page. Although arrow 490 shows that the LIDAR 400 is rotated in a counterclockwise direction, additionally or alternatively, LIDAR 400 may be rotated in the clockwise direction. In some examples, LIDAR 400 may be rotated 360 degrees about the axis. In other examples, LIDAR 400 may be rotated back and forth across a different range of angles. For example, LIDAR 400 may be mounted on a platform that pivots back and forth about the axis without making a complete rotation.

Thus, the arrangement of the light sources 422a-c and the detectors 432a-c may allow the LIDAR 400 to have a particular vertical field-of-view. In one implementation, the vertical FOV of the LIDAR 400 is 20°. Additionally, the rotation of the LIDAR 400 may allow the LIDAR 400 to have a 360° horizontal FOV. Further, the rate of rotation may allow the device to have a particular refresh rate. In one implementation, the refresh rate is 10 Hz (e.g., 10 360 degree rotations per second. The refresh rate along with the arrangement of the light sources 422a-c and the detectors 432a-c may also allow the LIDAR 400 to have a particular angular resolution. In one example, the angular resolution is 0.2°×0.3°. However, the various parameters described above, such as the refresh rate and the angular resolution may vary according to the configuration of the LIDAR 400.

It is noted that LIDAR 400 may include additional, fewer, or different components than those shown in FIGS. 4A-4B. For example, although LIDAR 400 is shown to include a single lens 440 for collimating transmitted light and focusing received light, LIDAR 400 may alternatively be implemented using a transmit lens for collimating the transmitted light and a separate receive lens for focusing the received light. Other examples are possible.

III. EXAMPLE METHODS AND COMPUTER-READABLE MEDIA

It is noted that the example arrangement described for LIDAR 400 is not meant to be limiting. Thus, the methods and processes described herein can be used with a variety of different LIDAR configurations, including LIDAR device 400 as well as other LIDAR arrangements. Additionally, the methods and processes described herein can be used with a variety of different types of active sensors such as any of the active sensing systems in the description of system 100 (e.g., SONARs, RADARs, LIDARs, etc.).

Figure 5:
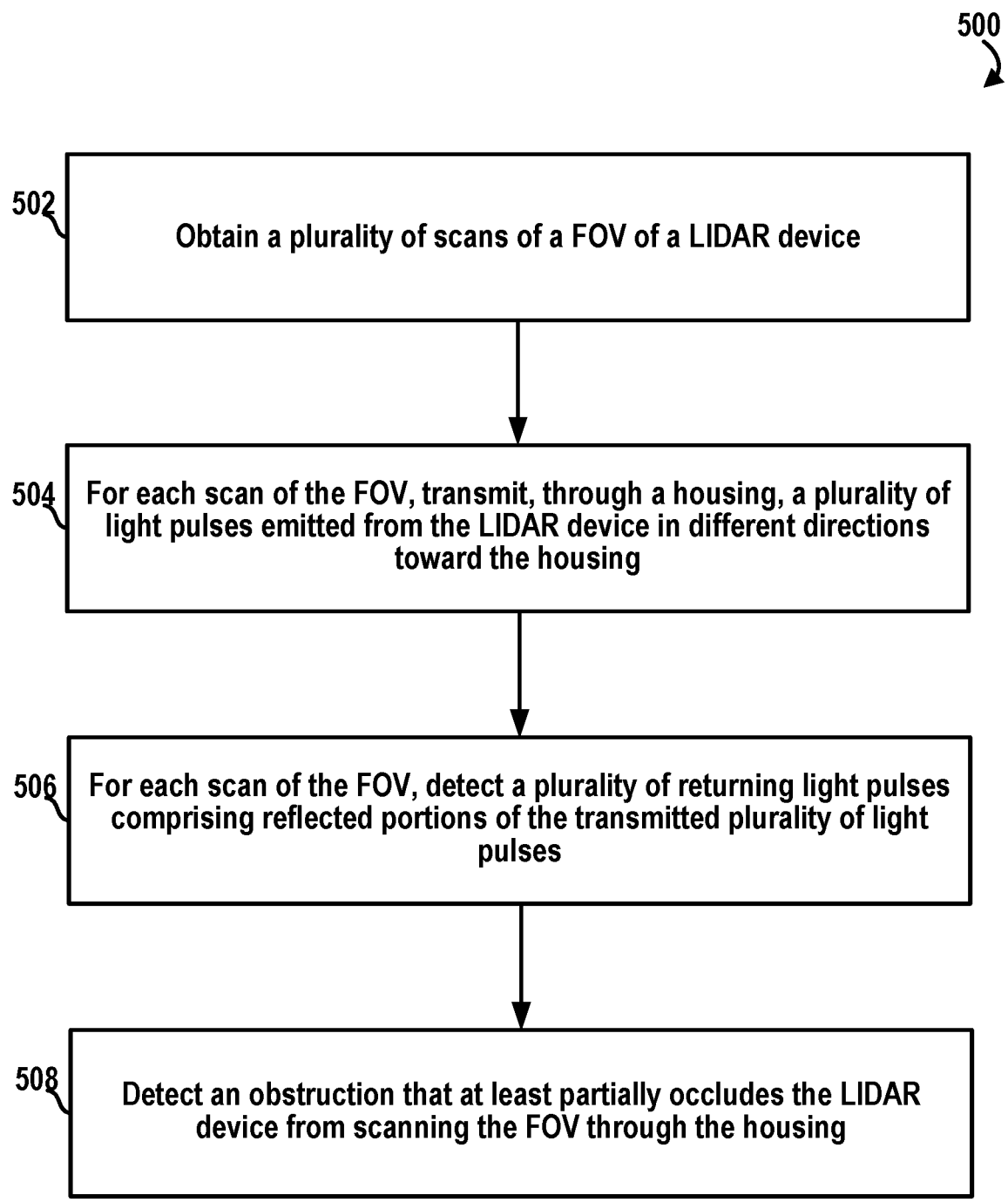
FIG. 5 is a flowchart of a method, according to an example embodiment.

FIG. 5 is a flowchart of a method 500, according to an example embodiment. Method 500 shown in FIG. 5 presents an embodiment of a method that could be used with any of vehicles 100, 200, system 300, and/or LIDAR device 400, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 500 and other processes and methods disclosed herein, one or more blocks in the flowchart may represent circuitry that is wired to perform the specific logical functions in the process.

At block 502, method 500 involves obtaining a plurality of scans of a field-of-view (FOV) of a light detection and ranging (LIDAR) device. Referring back to FIG. 4A for example, the FOV of LIDAR 400 may extend across a range of angles defined by the rotation of LIDAR 400 about the axis of rotation of LIDAR 400. In this example, LIDAR 400 may be configured to perform each scan of the FOV by rotating platform 410 from a first angular position (e.g., 0 degrees, etc.) to a final angular position (e.g., 360 degrees, etc.) about the axis while emitting light pulses in different directions into the FOV (and detecting returning reflections of the emitted light pulses). Additionally or alternatively, referring back to FIG. 4B for example, the FOV may be defined by the positions (and the relative arrangement) of the light emitters (422a, 422b, 422c, etc.) of LIDAR 400, and/or defined by a configuration of beam steering optical elements (e.g., lens 440, etc.) of LIDAR 400. Thus, for instance, the optical arrangement and configuration of LIDAR 400 may cause emitted light pulses 404a, 404b, and/or 404c to be spatially distributed across a range of angular directions away from LIDAR 400 (and/or to control the extent of divergence of each respective emitted light beam or pulse). Other examples are possible.

In some examples, method 500 involves obtaining a sequence of complete scans of the FOV during consecutive scanning time periods; and selecting the plurality of scans obtained at block 502 from the sequence of complete scans. Referring back to FIG. 4A for example, LIDAR 400 may be configured to repeatedly rotate (e.g., via platform 410) about an axis of rotation while scanning the FOV. In this example, each complete rotation of LIDAR 400 may correspond to a single complete scan of the sequence of complete scans. Additionally, in this example, a system of method 500 (e.g., system 300, vehicle 200, etc.) may select the plurality of scans from the sequence of complete scans based on a variety of factors.

In a first example, the system may select particular scans that were collected while the LIDAR device is in different locations in the environment. For instance, where the LIDAR device is mounted on a vehicle (e.g., vehicles 100, 200, etc.), the system may select a given scan of the sequence if it was performed while the LIDAR device was at a relatively different location than when a previous scan was selected from the sequence. To facilitate this for instance, the system may determine various locations of the LIDAR device during the plurality of scans using one or more sensors (e.g., GPS 226 of vehicle 200, etc.) configured to indicate locations of the system on which the LIDAR device is mounted.

Accordingly, in the first example, method 500 may involve determining a first location of the LIDAR device in an environment of the LIDAR device during a first scan of the sequence of complete scans and a second location of the LIDAR device during a second scan of the sequence of complete scans. Further, in the first example, selecting the plurality of scans may comprise selecting the first scan and the second scan based on a comparison of the first location and the second location.

In a second example, where the LIDAR device is mounted to the system, the system may select particular scans that were collected while the LIDAR device has different poses in the environment (i.e., while the system is in different orientations in the environment). To facilitate this for instance, the system may determine its pose or orientation during the plurality of scans using one or more sensors (e.g., IMU 228 of vehicle 200, etc.) configured to indicate an orientation of the system relative to the environment.

Accordingly, in the second example, the LIDAR device is mounted to a system configured to move in an environment; and method 500 involves determining a first orientation of the system relative to the environment during a first scan of the sequence of complete scans and a second orientation of the system during a second scan of the sequence of complete scans. Further, in the second example, selecting the plurality of scans may comprise selecting the first scan and the second scan based on a comparison of the first orientation and the second orientation.

In some examples, the system of method 500 may be configured to detect an obstruction disposed on a particular section of the housing more efficiently by diversifying the poses and locations of the LIDAR device associated with the plurality of scans obtained at block 502. For instance, a first region of the environment scanned through the particular section during a first scan may be different than a second region scanned through the same particular section during the second scan due to the change to the location and/or pose of the LIDAR device while collecting the first and second scans.

At block 504, method 500 involves transmitting, for each scan of the plurality of scans, a plurality of light pulses emitted from the LIDAR device in different directions toward the housing. Thus, in some examples, the LIDAR device may be disposed inside the housing and configured to scan the FOV through the housing.

Referring back to FIG. 1B for example, LIDAR 120 may be configured to emit light pulses in different directions while LIDAR 120 is rotating inside housing 126. In this example, each emitted light pulse may propagate through a respective section of housing 126 (and into the FOV). The shape, location, and size of the respective section may depend on various factors, such as a beam divergence of the emitted light pulse and the respective direction in which the emitted light pulse is emitted by LIDAR 120, among other possible factors.

Accordingly, in some examples, transmitting the plurality of light pulses at block 504 comprises emitting the plurality of light pulses from the LIDAR device in different directions toward the housing; and/or transmitting the plurality of light pulses through a plurality of sections of the housing.

In a first example, emitting the plurality of light pulses from the LIDAR device in different directions toward the housing comprises rotating the LIDAR device about an axis while the LIDAR device is emitting the plurality of light pulses. For instance, the LIDAR device about the axis may comprise rotating the LIDAR device relative to the housing, in line with the discussion above. Additionally, for example, rotating the LIDAR device about the axis may cause one or more light emitters of the LIDAR device to move relative to the housing. Further, in this example, the one or more light emitters may be configured to emit the transmitted plurality of light pulses (of block 504). Referring back to FIG. 4B for example, each of light emitters 422a, 422b, 422c may be mounted inside LIDAR device 400 in a particular relative arrangement. Thus, the rotation of LIDAR 400 indicated by arrow 490 may cause the light emitters to move with LIDAR 400. Further, referring now to FIG. 1B, in an implementation where LIDAR 400 is disposed inside housing 126 instead of LIDAR 120, the light emitters of LIDAR 400 could thus move relative to housing 126 in response to the rotation of LIDAR 400.

In a second example, emitting the plurality of light pulses from the LIDAR device in different directions toward the housing comprises causing a light emitter in the LIDAR device to emit a series of light pulses toward a beam-steering apparatus in the LIDAR device that includes one or more optical elements; and steering, via the one or more optical elements each light pulse of the series of light pulses in a different respective direction toward the housing. Referring back to FIG. 1C for example, LIDAR 130 may include a light emitter (not shown) that emits the series of light pulses (e.g., periodically, etc.) toward a rotating mirror or type of optical element(s) (e.g., MEMS array, optical phase modulation system, or any other beam-steering device). In this example, LIDAR 130 may rotate the rotating mirror to direct each light pulse in the emitted series from the light emitter in a different respective direction toward a different section of housing 136. Other examples are possible.

In some examples, transmitting the plurality of light pulses at block 504 comprises causing a first light emitter of the LIDAR device to emit a first diverging light beam and a second light emitter of the LIDAR device to emit a second diverging light beam; and transmitting the first diverging light beam through a first section of the housing and the second diverging light beam through a second section of the housing. Referring back to FIG. 4B for example, lens 440 may be configured to direct emitted light beam 404a in a first direction as the first diverging light beam and emitted light beam 404b in a second direction as the second diverging light beam. Referring back to FIG. 1B, consider an example where LIDAR 120 corresponds to LIDAR 400. In this example, diverging light beam 404a emitted in the first direction may thus intersect housing 126 at the first section of housing 126; and diverging light beam 404b emitted in the second direction may thus intersect housing 126 at the second section of housing 126.

In some examples, the first section of the housing at least partially overlaps the second section of the housing. Continuing with the example above, the respective beam paths of diverging light beams 404a and 404b may intersect one another prior to or at housing 126 such that a portion of the first section of the housing illuminated by beam 404a is also included in the second section of the housing illuminated by beam 404b.

At block 506, method 500 involves detecting, for each scan of the plurality of scans, a plurality of returning light pulses comprising reflected portions of the transmitted plurality of light pulses. Referring back to FIG. 4B for example, LIDAR 400 may focus reflected portions of emitted light pulses 404a, 404b, 404c that return to LIDAR 400 from respective regions in the FOV illuminated by the emitted light pulses onto respective light detectors 432a, 432b, 432c that are aligned to receive these respective focused reflected light portions (e.g., focused light 408a, 408b, 408c). Other examples are possible.

At block 508, method 500 involves detecting an obstruction that at least partially occludes the LIDAR device from scanning the FOV through the housing. In some examples, the detection at block 508 may be based on the plurality of scans obtained at block 502.

In some scenarios, the LIDAR device may fail to detect a reflection of a particular transmitted light pulse (even when no occlusion or obstruction is present). In a first scenario, some of the transmitted and/or reflected light pulses may be diverted away from an expected optical path due to environmental factors (e.g., small particles in the air, electromagnetic noise, weather conditions, etc.). In a second scenario, some of the transmitted and/or reflected light pulses may not be detected due to a characteristic of the system or the LIDAR device (i.e., not due to an external occlusion), such as pulses degraded by a filter of the LIDAR device, pulses diverted by an aperture of the LIDAR, pulses diverted due to a misalignment error, or pulses that are not detected due to other intrinsic characteristics of the system (e.g., sensitivity of the detectors, intrinsic measurement errors, variations in the thickness of the housing, etc.). In a third scenario, one or more light pulses may be temporarily occluded by an object in the FOV (e.g., a flying piece of paper that occludes the LIDAR device only for a short period of time, a large truck passing near the system in which the LIDAR device is mounted, etc.).

Accordingly, in some examples, a system of method 500 may be configured to determine a likelihood that the obstruction is physically coupled to the LIDAR device (e.g., attached to the LIDAR device, or attached to another nearby structure, etc.), the extent of the occluded portion of the FOV, a material type of the obstruction, and/or whether the obstruction is likely to remain physically coupled to the LIDAR device if no responsive action is taken (e.g., without activating a cleaning apparatus, etc.). For instance, the system can make these determinations by assessing various factors such as: returning light pulse intensities or numbers, estimated ranges of (i.e., distances to) objects in the FOV that reflected the returning light pulses, prior information about the prevalence of a certain type of obstruction in a region of the environment where the LIDAR device is currently located, a speed of a vehicle on which the LIDAR device is mounted, and/or corroborating data from other sensors, among other possible factors.

In some examples, method 500 may involve determining whether the obstruction detected at block 508 is coupled to the LIDAR device. Thus, for instance, a system of method 500 may distinguish obstructions that remain physically attached at or near the housing regardless of the position of the system in the environment from external obstructions that may no longer become present if the system (e.g., vehicle 100, etc.) moves to a different position in the environment.

In a first example, method 500 may involve determining whether the obstruction is coupled to the LIDAR device based on the plurality of scans obtained at block 502. For example, a system of method 500 may monitor first respective numbers of light pulses transmitted toward the FOV, and second respective numbers of corresponding reflected light pulses detected by the LIDAR device at block 506. Depending on a variety of factors, the system can then use the monitored numbers to decide if the FOV (or a portion thereof) is occluded by an obstruction that is physically coupled at or near the LIDAR device. For instance, if the second respective numbers of the reflected light pulses remains lower than a threshold number during multiple scans of the plurality of scans, then the system may determine that the obstruction that occludes the LIDAR device from scanning the FOV is likely present. Alternatively, for instance, if only one or few scan are associated with less than the threshold number of detected light pulses, then the system may determine that the obstruction is less likely to be present (and/or less likely to be physically attached to the housing, etc.). Other examples for using the plurality of scans as a basis for determining whether the obstruction is coupled to the LIDAR device are possible as well.

In a second example, determining whether the obstruction is coupled to the LIDAR device may involve determining whether the obstruction remains at an offset position relative to the LIDAR device in response to a movement of the LIDAR device from a first location to a second location in an environment of the LIDAR device. For instance, where the LIDAR device is mounted on a vehicle (e.g., vehicle 100, 200, etc.), a computing system (e.g., computing system 210) of the vehicle may compare measurements of a distance between the LIDAR device and the obstruction indicated by a first scan (performed when the LIDAR device is at the first location) and a second scan (performed when the LIDAR device is at the second location). If the comparison indicates that the obstruction remains at a particular offset position relative to the LIDAR device, then the computing system can determine that the obstruction is physically coupled to the LIDAR device (e.g., attached to the housing or attached to the vehicle). Alternatively or additionally, in this example, if the distance to the obstruction changes and/or is no longer present after the vehicle (and thus the LIDAR device) moves from the first location to the second location, then the computing system may determine that the occlusion is not coupled to the LIDAR device (e.g., a nearby object in the environment that is not physically attached to (or near) the LIDAR device, etc.).

Accordingly, in some examples, determining whether the obstruction is coupled to the LIDAR device comprises determining whether the obstruction is physically attached to the housing. Additionally, in some examples, the LIDAR device is mounted to a system (e.g., vehicles 100, 200, etc.) configured to move in an environment. In these examples, determining whether the obstruction is coupled to the LIDAR device comprises determining whether the obstruction is physically attached to the system.

In some examples, method 500 involves determining that the obstruction does not occlude the LIDAR device from scanning the FOV through one or more sections of the housing.

In a first example, a system of method 500 may identify a first subset of the plurality of returning light pulses (detected at block 506) that are reflected from less than a threshold distance to the LIDAR device as feedback returns. The feedback returns, for instance, may correspond to reflected light pulses that are reflected at or near the housing. In some implementations, the threshold distance may be based on pulse lengths of the plurality of transmitted light pulses. For instance, if a transmitted light pulse is one meter long, then any reflection of that light pulse that is reflected from a distance of one meter or less away from the LIDAR may be deemed a feedback return. In one embodiment, the threshold distance is less than three meters. Other threshold distances are possible as well.

Continuing with the first example, the system may then identify bright light pulses in feedback returns that have light intensities that are greater than a brightness threshold. For instance, the bright light pulses may correspond to light pulses that were reflected by the obstruction (e.g., obstruction may be less transparent and/or more reflective than the material of the housing itself). In some implementations, method 500 may involve adjusting the brightness threshold for each scan of the plurality of scans based on the light intensities of the feedback returns of the scan. For instance, the respective brightness of the returning light pulses from each scan may change due to environmental factors (e.g., scan during night time versus scan during day time, etc.). Thus, the brightness threshold of each scan can be adjusted to more accurately and/or reliably detect brightness variations between feedback returns associated with an obstructed section of the housing and feedback returns associated with unobstructed sections.

In one implementation, the brightness threshold for a particular scan may be adjusted based on light intensity measurements by a particular channel (e.g., one of the light detectors) in the particular scan. For instance, referring back to FIG. 4B, the scanned scene may be represented as a table of values that has a number of rows (r) and a number of columns (c). Each row may correspond to measurements (e.g., light intensity values, range values, etc.) indicated by a respective LIDAR channel (e.g., light detector 432*a*, 432*b*, or 432*c*). In some embodiments, the respective brightness threshold for each channel can be computed according to a percentile (P) of the measurements indicated by that channel. In one embodiment, the brightness threshold can be selected such that P=25%. In this embodiment, obstructions covering up to 1−P=75% of the field of view may be detected because they are greater than the brightness threshold. Additionally, in some instances, the brightness threshold can be adjusted using a scale factor multiplied to the percentile value and/or by adding a constant. For instance, an example brighter threshold can be selected that is five times (e.g., scale factor) brighter than the darkest 25% of the measurements. It is noted that other percentile values, scale factor values, and/or constants are possible as well.

Continuing with the first example, the system may then determine that the one or more sections of the housing are not occluded by the obstruction if a ratio of the bright light pulses relative to the total number of light pulses is less than a first threshold ratio (e.g., less than 95% or any other fraction).

Accordingly, in the first example, method 500 may involve identifying the first subset of the plurality of returning light pulses that are reflected from less than the threshold distance as the feedback returns; identifying the bright light pulses of the feedback returns based on the bright light pulses having light intensities that are greater than a threshold brightness; and determining that the one or more sections of the housing are not occluded by the obstruction based on a ratio of the bright light pulses to a sum of the feedback returns being less than the first threshold ratio. More generally, in some instances, method 500 may involve determining a count of the bright light pulses and detecting the obstruction based on the determined count.

Additionally or alternatively, in a second example, the system of method 500 may identify a second subset of the plurality of returning light pulses (detected at block 506) that are reflected from greater than the threshold distance to the LIDAR device as world returns. The system may then determine that the one or more sections of the housing are not occluded by the obstruction if a ratio of a number of the transmitted plurality of light pulses (of block 504) relative to a number of the world returns is less than a second threshold ratio (e.g., less than 95% or any other fraction). The second threshold ratio may have a same value as the first threshold ratio or may have a different value.

Accordingly, in the second example, method 500 may involve identifying the second subset of the plurality of returning light pulses that are reflected from greater than the threshold distance as the feedback returns; and determining that the one or more sections of the housing are not occluded by the obstruction based on a ratio of the number of world returns to a number of the transmitted plurality of light pulses being less than the second threshold ratio.

In the first and second examples, the system could thus detect relatively large obstructions that occlude all or most of the FOV from being scanned by the LIDAR device (e.g., a blanket or other object that covers the housing, etc.). However, in some scenarios, a relatively smaller obstruction may occlude the LIDAR device from scanning a portion of the FOV through a particular section of the housing (e.g., dirt, bird droppings, oil, etc., disposed on the particular section).

In a third example, the system of method 500 be configured to monitor light intensities of respective subsets of the feedback returns received by the LIDAR device from a respective plurality of sections of the housing. The system may then determine that the one or more sections are not occluded by the obstruction by comparing first light intensities of first feedback returns received from a particular section of the housing with second light intensities of second feedback returns received from the one or more sections of the housing. For instance, if the first feedback returns include more bright light pulses than the second feedback returns, then the system may determine that only the particular section is occluded by the obstruction.

Accordingly, in some examples, method 500 may involve identifying a particular section of the housing interposed between the LIDAR device and the obstruction. Additionally, in some examples, method 500 may involve: determining first light intensities of first returning light pulses received by the LIDAR device from the particular section of the housing; determining second light intensities of other returning light pulses received by the LIDAR device from the one or more sections of the housing; and identifying the particular section of the housing based on the first light intensities and the second light intensities.

In some examples, method 500 involves determining whether a particular section of the housing is occluded based on predetermined characteristics of an object scanned via the particular section. In a first example, a particular range to a particular object in the scene may be predetermined (e.g., scanned using another sensor, etc.). In this example, the range value computed based on a returning light pulse from the particular section of the housing can be compared with the particular range to determine whether that particular section is occluded. In a second example, a particular light intensity (e.g., brightness) of the particular object may be predetermined (e.g., scanned using another LIDAR or via a different section of the housing, etc.). In this example, the particular light intensity can be compared with the light intensity measurement of a returning light pulse received through the particular section of the housing to determine whether the particular section is occluded. Other examples are possible.

In some examples, method 500 involves operating a cleaning apparatus based on the identification of the particular section of the housing. Referring back to FIG. 3 for example, system 300 may operate one of cleaning apparatuses 360 (e.g., water spray, air pump, wiper, etc.) to attempt cleaning the identified particular section of the housing.

In some examples, method 500 involves determining a type of the obstruction based on the plurality of scans; and operating the cleaning apparatus further based on the determination of the type of obstructions.

In a first example, a system of method 500 may determine that the obstruction corresponds to an object disposed on or near the housing such that the obstruction occludes all or most of the FOV. In this example, the system may then determine that operating the cleaning apparatus may not remove the obstruction. In one implementation, the system may alert (e.g., via peripherals 208 of vehicle 200, etc.) a user (e.g., a user of vehicle 100, 200, etc.) that the LIDAR device is obstructed. In another implementation, the system (e.g., vehicle 200) may exit an autonomous navigation mode in response to the determination, for instance.

In a second example, the system may determine that the obstruction corresponds to a bird dropping or other solid object disposed on the particular section of the housing if feedback returns associated with the particular section include bright light pulses (e.g., having light intensities greater than the brightness threshold) and the number of world returns associated with the particular section is less than a threshold. In this example, the system may then operate one or more cleaning apparatuses (e.g., water spray and wiper) to attempt removal of the obstruction from the particular section.

In a third example, the system may determine that the obstruction corresponds to mud or other mixture of solid and liquid objects disposed on the particular section of the housing if feedback returns associated with the particular section include bright light pulses and the associated world returns are dim (e.g., lower light intensities than other world returns associated with other sections of the housing). In this example, the system may then operate an appropriate cleaning apparatus (e.g., wiper, air pump, etc.) for attempting removal of that particular type of obstruction. Other examples are possible.

In some examples, method 500 may involve generating navigation instructions for navigating a vehicle in an environment based on at least data from the LIDAR device; adjusting the navigation instructions in response to the detection of the obstruction. Referring back to FIG. 2 for example, control system 206 may use data from LIDAR 232 to generate navigation instructions (e.g., via navigation system 248) for vehicle 200. Thus, if vehicle 200 determines that LIDAR 232 is at least partially occluded by the obstruction, vehicle 200 may then adjust the navigation instructions (e.g., stop the vehicle, exit an autonomous mode of the vehicle, attempt to navigate the vehicle using other sensor data from sensor system 204, etc.).

In some examples, method 500 involves identifying an object scanned by the LIDAR device through a first section of the housing during a first scan of the plurality of scans and through a second section of the housing during a second scan of the plurality of scans; and comparing a first portion of the first scan associated with the identified object to a second portion of the second scan associated with the identified object. In these examples, detecting the obstruction at block 508 may be based on the comparison. By way of example, the LIDAR device may be mounted on a vehicle that moves in an environment while the LIDAR device is obtaining the plurality of scans at block 502. Thus, in this example, a particular object in the environment may be scanned via the first section when the vehicle is in a first position or orientation in the environment; and via the second section when the vehicle is in a second position or orientation in the environment. Thus, in this example, the system of method 500 could compare the first portion of the first scan to the second portion of the second scan (e.g., compare light intensities of the respective returning light pulses in the first portion and the second portion, etc.) to determine if the first section or the second section corresponds to the particular section that is at least partially occluded by the obstruction.

In some examples, method 500 involves identifying a region of an environment scanned by the LIDAR device through a first section of the housing during a first scan of the plurality of scans and through a second section of the housing during a second scan of the plurality of scans; and comparing a first portion of the first scan associated with the identified region to a second portion of the second scan associated with the identified region. In these examples, detecting the obstruction at block 508 may be based on the comparison. As a variation of the example of the identified object above, the system may compare portions of the two scans associated with a particular region in the environment instead of portions associated with a particular object.

In some examples, the LIDAR device is mounted to a system and a second LIDAR device is mounted to the same system. In these examples, method 500 may also involve identifying an object scanned by the LIDAR device during a first scan of the plurality of scans and scanned by the second LIDAR device during a second scan of the environment by the second LIDAR device; and comparing a first portion of the first scan associated with the identified object to a second portion of the second scan associated with the identified object. In these examples, detecting the obstruction at block 508 may be based on the comparison. Referring back to FIG. 1D for example, the FOV scanned by LIDAR 120 (between contours 160 and 162) may partially overlap the FOV scanned by LIDAR 130 (contour 166). In this example, the identified object may be located within the overlapping region of the two FOVs. Thus, vehicle 100 may compare the portions of the two scans by the two LIDARs where the object is located as a basis for detecting an obstruction disposed on housing 126 that encompasses LIDAR 120.

In some examples, the LIDAR device is mounted to a system and a second LIDAR device is mounted to the same system. In these examples, method 500 may also involve identifying a region of the environment scanned by the LIDAR device during a first scan of the plurality of scans and scanned by the second LIDAR device during a second scan of the environment by the second LIDAR device; and comparing a first portion of the first scan associated with the identified object to a second portion of the second scan associated with the identified object. In these examples, detecting the obstruction at block 508 may be based on the comparison. As a variation of the example of the identified object above, the system may compare portions of the two scans associated with a particular region in the environment instead of portions associated with a particular object.

Figure 6:
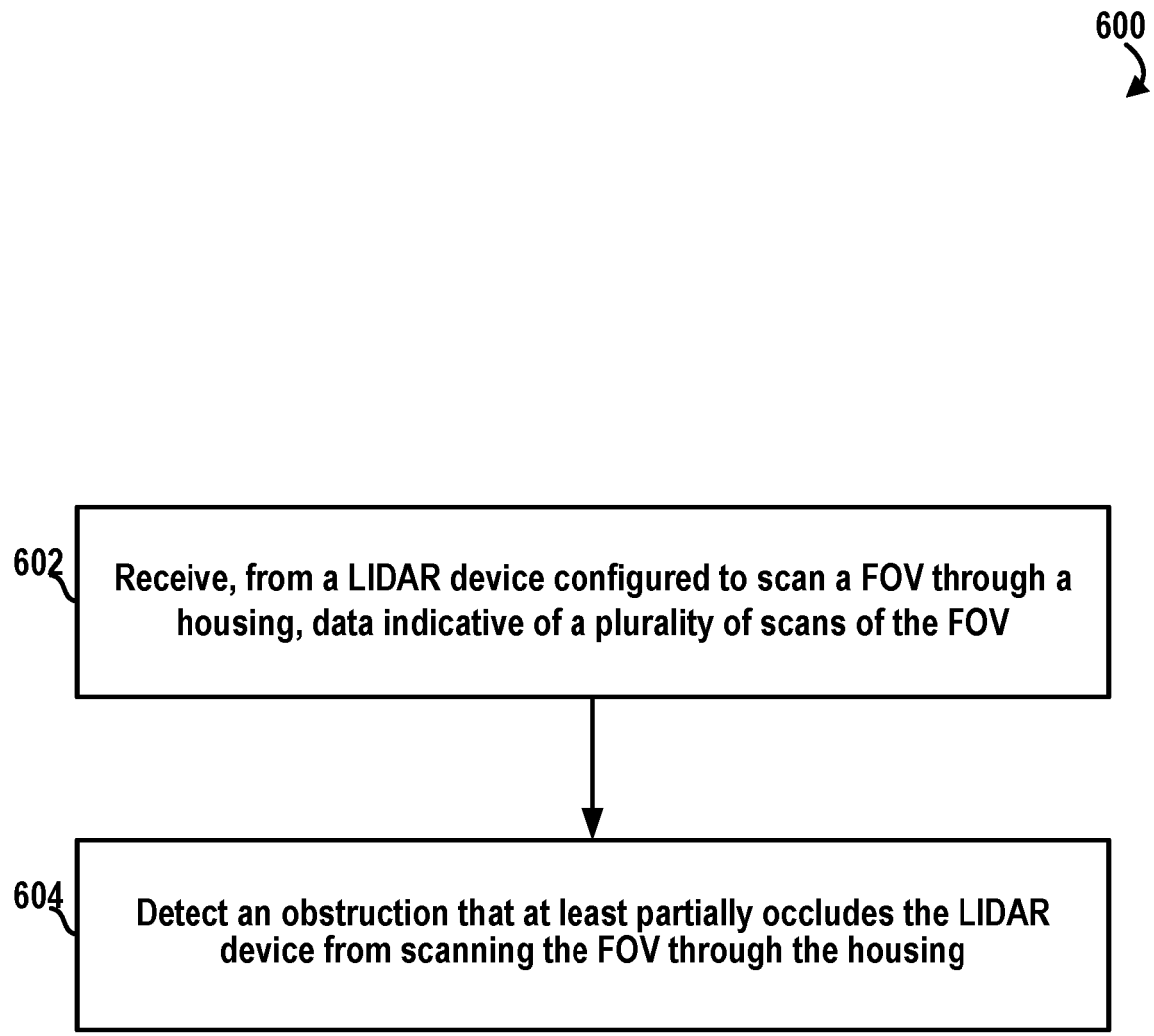
FIG. 6 is a flowchart of another method, according to an example embodiment.

FIG. 6 is a flowchart of a method 600, according to an example embodiment. Method 600 shown in FIG. 6 presents an embodiment of a method that could be used with any of the vehicles 100, 200, system 300, LIDAR device 400, and/or method 500, for example. Method 600 may include one or more operations, functions, or actions as illustrated by one or more of blocks 602-604. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, method 600 involves receiving data indicative of a plurality of scans of a FOV from a LIDAR device configured to scan the FOV through a housing. Referring back to FIG. 2 for example, computer system 210 may receive the data from LIDAR 232 indicating the plurality of scans that are collected in line with the discussion at block 502 of method 500. At block 604, method 600 involves detecting an obstruction that at least partially occludes the LIDAR device from scanning the FOV through the housing. For example, block 604 may be similar to block 508 of method 500.

IV. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements that are described are functional entities that may be implemented as discrete or distributed components or in conjunction with other components, in any suitable combination and location, or other structural elements described as independent structures may be combined. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The specification includes the following subject-matter, expressed in the form of clauses 1-45: 1. A method comprising: obtaining a plurality of scans of a field-of-view (FOV) of a light detection and ranging (LIDAR) device, wherein the LIDAR device is disposed inside a housing, and wherein obtaining each scan of the plurality of scans comprises: transmitting, through a plurality of sections of the housing, a plurality of light pulses emitted from the LIDAR device in different directions toward the housing, and detecting a plurality of returning light pulses comprising reflected portions of the transmitted plurality of light pulses that are reflected back toward the LIDAR device; and based on the plurality of scans, detecting an obstruction that at least partially occludes the LIDAR device from scanning the FOV through the housing. 2. The method of clause 1, further comprising determining whether the obstruction is coupled to the LIDAR device based on the plurality of scans. 3. The method of clause 2, wherein determining whether the obstruction is coupled to the LIDAR device comprises determining whether the obstruction is physically attached to the housing. 4. The method of clause 2 or 3, wherein the LIDAR device is mounted to a system configured to move in an environment, and wherein determining whether the obstruction is coupled to the LIDAR device comprises determining whether the obstruction is physically attached to the system. 5. The method of any of clauses 1-4, further comprising: determining that the obstruction does not occlude the LIDAR device from scanning the FOV through one or more sections of the housing; and identifying a particular section of the housing interposed between the LIDAR device and the obstruction. 6. The method of any of clauses 1-5, further comprising: selecting, as feedback returns of each scan, a first subset of the plurality of returning light pulses based on at least the first subset being reflected back to the LIDAR device from locations that are less than a threshold distance to the LIDAR device, wherein detecting the obstruction is based on at least light intensity measurements indicated by the LIDAR device for the feedback returns. 7. The method of clause 6, wherein the threshold distance is based on pulse lengths of the transmitted plurality of light pulses. 8. The method of clause 6 or 7, wherein the threshold distance is less than three meters. 9. The method of any of clauses 6-8, wherein detecting the obstruction comprises: identifying bright light pulses in the feedback returns based on the bright light pulses having respective light intensities that are greater than a brightness threshold. 10. The method of clause 9, further comprising: for each scan of the plurality of scans, adjusting the brightness threshold based on the light intensities of the feedback returns of the scan. 11. The method of clause 9 or 10, further comprising: determining a count of the bright light pulses, wherein detecting the obstruction is based on the determined count. 12. The method of any of clauses 6-11, further comprising: selecting, as world returns of each scan, a second subset of the plurality of returning light pulses based on at least the second subset being reflected back to the LIDAR device from locations that are greater than the threshold distance to the LIDAR device, wherein detecting the obstruction is further based on the world returns. 13. The method of clause 12, further comprising: determining a type of the obstruction based on the feedback returns and the world returns. 14. The method of any of clauses 1-13, wherein transmitting the plurality of light pulses comprises emitting the plurality of light pulses from the LIDAR device in different directions toward the housing, and wherein emitting the plurality of light pulses from the LIDAR device in different directions toward the housing comprises rotating the LIDAR device about an axis while the LIDAR device is emitting the plurality of light pulses. 15. The method of clause 14, wherein rotating the LIDAR device about the axis causes one or more light emitters of the LIDAR device to move relative to the housing, and wherein the transmitted plurality of light pulses are emitted by the one or more light emitters. 16. The method of clause 14 or 15, wherein rotating the LIDAR device about the axis comprises rotating the LIDAR device relative to the housing. 17. The method of any of clauses 1-16, wherein transmitting the plurality of light pulses comprises: causing a first light emitter of the LIDAR device to emit a first diverging light beam and a second light emitter of the LIDAR device to emit a second diverging light beam; and transmitting the first diverging light beam through a first section of the housing and the second diverging light beam through a second section of the housing. 18. The method of clause 17, wherein the first section of the housing at least partially overlaps the second section of the housing. 19. The method of any of clauses 1-18, further comprising: generating navigation instructions for navigating a vehicle in an environment based on at least data from the LIDAR device, wherein the LIDAR device is mounted to the vehicle; and in response to the detection of the obstruction, adjusting the navigation instructions. 20. A light detection and ranging (LIDAR) device comprising a controller configured to cause the LIDAR device to perform the method of any of clauses 1-19. 21. A system comprising a controller configured to cause the LIDAR device to perform the method of any of clauses 1-19. 22. The system of clause 21, wherein the system comprises a vehicle. 23. A method comprising: obtaining a plurality of scans of a field-of-view (FOV) of a light detection and ranging (LIDAR) device, wherein the LIDAR device is disposed inside a housing, and wherein obtaining each scan of the plurality of scans comprises: transmitting, through a plurality of sections of the housing, a plurality of light pulses emitted from the LIDAR device in different directions toward the housing, and detecting a plurality of returning light pulses comprising reflected portions of the transmitted plurality of light pulses that are reflected back toward the LIDAR device; based on the plurality of scans, detecting an obstruction that at least partially occludes the LIDAR device from scanning the FOV through the housing; determining that the obstruction does not occlude the LIDAR device from scanning the FOV through one or more sections of the housing; and identifying a particular section of the housing interposed between the LIDAR device and the obstruction. 24. The method of clause 23, further comprising determining whether the obstruction is coupled to the LIDAR device based on the plurality of scans. 25. The method of clause 23 or 24, further comprising: operating a cleaning apparatus based on the identification of the particular section of the housing. 26. The method of clause 25, further comprising: determining a type of the obstruction based on the plurality of scans, wherein operating the cleaning apparatus is further based on the determination of the type of the obstruction. 27. The method of any of clauses 23-26, further comprising: determining first light intensities of first returning light pulses received by the LIDAR device from the particular section of the housing; and determining second light intensities of other returning light pulses received by the LIDAR device from the one or more sections of the housing, wherein identifying the particular section of the housing is based on the first light intensities and the second light intensities. 28. The method of any of clauses 23-27, further comprising: identifying an object scanned by the LIDAR device through a first section of the housing during a first scan of the plurality of scans and through a second section of the housing during a second scan of the plurality of scans; and comparing a first portion of the first scan associated with the identified object to a second portion of the second scan associated with the identified object, wherein detecting the obstruction is based on the comparison. 29. The method of any of clauses 23-28, further comprising: identifying a region of an environment scanned by the LIDAR device through a first section of the housing during a first scan of the plurality of scans and through a second section of the housing during a second scan of the plurality of scans; and comparing a first portion of the first scan associated with the identified region to a second portion of the second scan associated with the identified region, wherein detecting the obstruction is based on the comparison. 30. The method of any of clauses 23-29, wherein the LIDAR device is mounted to a system, wherein a second LIDAR device is mounted to the system, the method further comprising: identifying an object scanned by the LIDAR device during a first scan of the plurality of scans and scanned by the second LIDAR device during a second scan of the environment by the second LIDAR device; and comparing a first portion of the first scan associated with the identified object to a second portion of the second scan associated with the identified object, wherein detecting the obstruction is further based on the comparison. 31. The method of any of clauses 23-30, wherein the LIDAR device is mounted to a system, wherein a second LIDAR device is mounted to the system, the method further comprising: identifying a region of an environment scanned by the LIDAR device during a first scan of the plurality of scans and scanned by the second LIDAR device during a second scan of the environment by the second LIDAR device; and comparing a first portion of the first scan associated with the identified region to a second portion of the second scan associated with the identified region, wherein detecting the obstruction is further based on the comparison. 32. The method of any of clauses 23-31, wherein obtaining the plurality of scans comprises: obtaining a sequence of complete scans of the FOV during consecutive scanning time periods; and selecting the plurality of scans from the sequence of complete scans. 33. The method of clause 32, further comprising: determining a first location of the LIDAR device in an environment of the LIDAR device during a first scan of the sequence of complete scans and a second location of the LIDAR device during a second scan of the sequence of complete scans, wherein selecting the plurality of scans comprises selecting the first scan and the second scan based on a comparison of the first location and the second location. 34. The method of clause 32 or 33, wherein the LIDAR device is mounted to a system configured to move in an environment of the system, the method further comprising: determining a first orientation of the system relative to the environment during a first scan of the sequence of complete scans and a second orientation of the system during a second scan of the sequence of complete scans, wherein selecting the plurality of scans comprises selecting the first scan and the second scan based on a comparison of the first orientation and the second orientation. 35. The method of any of clauses 23-34, further comprising: selecting, as feedback returns of each scan, a first subset of the plurality of returning light pulses based on at least the first subset being reflected back to the LIDAR device from locations that are less than a threshold distance to the LIDAR device, wherein detecting the obstruction is based on at least light intensity measurements indicated by the LIDAR device for the feedback returns. 36. The method of any of clauses 23-35, wherein transmitting the plurality of light pulses comprises emitting the plurality of light pulses from the LIDAR device in different directions toward the housing, and wherein emitting the plurality of light pulses from the LIDAR device in different directions toward the housing comprises rotating the LIDAR device about an axis while the LIDAR device is emitting the plurality of light pulses. 37. The method of clause 36, wherein rotating the LIDAR device about the axis causes one or more light emitters of the LIDAR device to move relative to the housing, and wherein the transmitted plurality of light pulses are emitted by the one or more light emitters. 38. The method of any of clauses 23-37, wherein emitting the plurality of light pulses from the LIDAR device in different directions toward the housing comprises: causing a light emitter in the LIDAR device to emit a series of light pulses toward a beam-steering apparatus in the LIDAR device that includes one or more optical elements; and steering, via the one or more optical elements, each light pulse of the series of light pulses in a different respective direction toward the housing. 39. The method of any of clauses 23-38, wherein transmitting the plurality of light pulses comprises: causing a first light emitter of the LIDAR device to emit a first diverging light beam and a second light emitter of the LIDAR device to emit a second diverging light beam; and transmitting the first diverging light beam through a first section of the housing and the second diverging light beam through a second section of the housing. 40. A light detection and ranging (LIDAR) device comprising: a housing; a controller configured to cause the LIDAR device to perform operations comprising: obtaining a plurality of scans of a field-of-view (FOV) of the LIDAR device; for each scan of the plurality of scans: transmitting, through the housing, a plurality of light pulses emitted from the LIDAR device in different directions toward the housing, and detecting a plurality of returning light pulses comprising reflected portions of the transmitted plurality of light pulses; based on the plurality of scans, detecting an obstruction that at least partially occludes the LIDAR device from scanning the FOV through the housing; determining that the obstruction does not occlude the LIDAR device from scanning the FOV through one or more sections of the housing; and identifying a particular section of the housing interposed between the LIDAR device and the obstruction. 41. The LIDAR device of clause 40, wherein the housing comprises a dome-shaped light filter. 42. A system comprising: a housing; a light detection and ranging (LIDAR) device disposed inside the housing, wherein the LIDAR device is configured to scan a field-of-view (FOV) through the housing, wherein the LIDAR device is configured to transmit, for each scan of the FOV, a plurality of light pulses emitted from the LIDAR device in different directions toward the housing, and wherein the LIDAR device is configured to receive, for each scan of the FOV, a plurality of returning light pulses comprising reflected portions of the transmitted plurality of light pulses reflected back to the LIDAR device; one or more processors; and data storage storing instructions that, when executed by the one or more processors, cause the system to perform operations comprising: receiving, from the LIDAR device, data indicative of a plurality of scans of the FOV; based on the received data, detecting an obstruction that at least partially occludes the LIDAR device from scanning the FOV through the housing; determining that the obstruction does not occlude the LIDAR device from scanning the FOV through one or more sections of the housing; and identifying a particular section of the housing interposed between the LIDAR device and the obstruction. 43. A light detection and ranging (LIDAR) device comprising a controller configured to cause the LIDAR device to perform the method of any of clauses 23-39. 44. A system comprising a controller configured to cause the LIDAR device to perform the method of any of clauses 23-39. 45. The system of clause 44, wherein the system comprises a vehicle.

What is claimed is:
1. A method comprising:
obtaining a plurality of scans of a field-of-view (FOV) of a light detection and ranging (LIDAR) device, wherein the LIDAR device is disposed inside a housing, and wherein obtaining each scan of the plurality of scans comprises:
transmitting, through a plurality of sections of the housing, a plurality of light pulses emitted from the LIDAR device in different directions toward the housing, and detecting a plurality of returning light pulses comprising reflected portions of the transmitted plurality of light pulses that are reflected back toward the LIDAR device;

based on the plurality of scans, detecting an obstruction that at least partially occludes the LIDAR device from scanning the FOV through the housing, wherein detecting the obstruction comprises:

identifying an object scanned by the LIDAR device through a first section of the housing during a first scan of the plurality of scans and through a second section of the housing during a second scan of the plurality of scans; and comparing a first portion of the first scan associated with the identified object to a second portion of the second scan associated with the identified object;

determining that the obstruction does not occlude the LIDAR device from scanning the FOV through one or more sections of the housing; and identifying a particular section of the housing interposed between the LIDAR device and the obstruction.

2. The method of claim 1, further comprising determining whether the obstruction is coupled to the LIDAR device based on the plurality of scans.

3. The method of claim 1, further comprising:
operating a cleaning apparatus based on the identification of the particular section of the housing.

4. The method of claim 3, further comprising:
determining a type of the obstruction based on the plurality of scans, wherein operating the cleaning apparatus is further based on the determination of the type of the obstruction.

5. The method of claim 1, further comprising:
determining first light intensities of first returning light pulses received by the LIDAR device from the particular section of the housing; and determining second light intensities of other returning light pulses received by the LIDAR device from the one or more sections of the housing, wherein identifying the particular section of the housing is based on the first light intensities and the second light intensities.

6. The method of claim 1, wherein detecting the obstruction further comprises:
identifying a region of an environment scanned by the LIDAR device through a first section of the housing during a first scan of the plurality of scans and through a second section of the housing during a second scan of the plurality of scans; and comparing a first portion of the first scan associated with the identified region to a second portion of the second scan associated with the identified region.

7. The method of claim 1, wherein the LIDAR device is mounted to a system, wherein a second LIDAR device is mounted to the system, wherein detecting the obstruction further comprises:
identifying an object scanned by the LIDAR device during a first scan of the plurality of scans and scanned by the second LIDAR device during a second scan of the environment by the second LIDAR device; and comparing a first portion of the first scan associated with the identified object to a second portion of the second scan associated with the identified object.

8. The method of claim 1, wherein the LIDAR device is mounted to a system, wherein a second LIDAR device is mounted to the system, wherein detecting the obstruction further comprises:

identifying a region of an environment scanned by the LIDAR device during a first scan of the plurality of scans and scanned by the second LIDAR device during a second scan of the environment by the second LIDAR device; and comparing a first portion of the first scan associated with the identified region to a second portion of the second scan associated with the identified region.

9. The method of claim 1, wherein obtaining the plurality of scans comprises:
obtaining a sequence of complete scans of the FOV during consecutive scanning time periods; and selecting the plurality of scans from the sequence of complete scans.

10. The method of claim 9, further comprising:
determining a first location of the LIDAR device in an environment of the LIDAR device during a first scan of the sequence of complete scans and a second location of the LIDAR device during a second scan of the sequence of complete scans, wherein selecting the plurality of scans comprises selecting the first scan and the second scan based on a comparison of the first location and the second location.

11. The method of claim 9, wherein the LIDAR device is mounted to a system configured to move in an environment of the system, the method further comprising:
determining a first orientation of the system relative to the environment during a first scan of the sequence of complete scans and a second orientation of the system during a second scan of the sequence of complete scans, wherein selecting the plurality of scans comprises selecting the first scan and the second scan based on a comparison of the first orientation and the second orientation.

12. The method of claim 1, wherein detecting the obstruction further comprises:
selecting, as feedback returns of each scan, a first subset of the plurality of returning light pulses based on at least the first subset being reflected back to the LIDAR device from locations that are less than a threshold distance to the LIDAR device; and identifying light intensity measurements indicated by the LIDAR device for the feedback returns that are greater than a brightness threshold.

13. The method of claim 1, wherein transmitting the plurality of light pulses comprises emitting the plurality of light pulses from the LIDAR device in different directions toward the housing, and wherein emitting the plurality of light pulses from the LIDAR device in different directions toward the housing comprises rotating the LIDAR device about an axis while the LIDAR device is emitting the plurality of light pulses.

14. The method of claim 13, wherein rotating the LIDAR device about the axis causes one or more light emitters of the LIDAR device to move relative to the housing, and wherein the transmitted plurality of light pulses are emitted by the one or more light emitters.

15. The method of claim 1, wherein emitting the plurality of light pulses from the LIDAR device in different directions toward the housing comprises:
causing a light emitter in the LIDAR device to emit a series of light pulses toward a beam-steering apparatus in the LIDAR device that includes one or more optical elements; and steering, via the one or more optical elements, each light pulse of the series of light pulses in a different respective direction toward the housing.

16. The method of claim 1, wherein transmitting the plurality of light pulses comprises:
causing a first light emitter of the LIDAR device to emit a first diverging light beam and a second light emitter of the LIDAR device to emit a second diverging light beam; and
transmitting the first diverging light beam through a first section of the housing and the second diverging light beam through a second section of the housing.

17. A light detection and ranging (LIDAR) device comprising:
a housing;
a controller configured to cause the LIDAR device to perform operations comprising:
obtaining a plurality of scans of a field-of-view (FOV) of the LIDAR device;
for each scan of the plurality of scans:
transmitting, through the housing, a plurality of light pulses emitted from the LIDAR device in different directions toward the housing, and
detecting a plurality of returning light pulses comprising reflected portions of the transmitted plurality of light pulses;
based on the plurality of scans, detecting an obstruction that at least partially occludes the LIDAR device from scanning the FOV through the housing, wherein detecting the obstruction comprises:
identifying an object scanned by the LIDAR device through a first section of the housing during a first scan of the plurality of scans and through a second section of the housing during a second scan of the plurality of scans; and
comparing a first portion of the first scan associated with the identified object to a second portion of the second scan associated with the identified object;
determining that the obstruction does not occlude the LIDAR device from scanning the FOV through one or more sections of the housing; and
identifying a particular section of the housing interposed between the LIDAR device and the obstruction.

18. The LIDAR device of claim 17, wherein the housing comprises a dome-shaped light filter.

19. A system comprising:
a housing;
a light detection and ranging (LIDAR) device disposed inside the housing, wherein the LIDAR device is configured to scan a field-of-view (FOV) through the housing,
wherein the LIDAR device is configured to transmit, for each scan of the FOV, a plurality of light pulses emitted from the LIDAR device in different directions toward the housing, and
wherein the LIDAR device is configured to receive, for each scan of the FOV, a plurality of returning light pulses comprising reflected portions of the transmitted plurality of light pulses reflected back to the LIDAR device;
one or more processors; and
data storage storing instructions that, when executed by the one or more processors, cause the system to perform operations comprising:
receiving, from the LIDAR device, data indicative of a plurality of scans of the FOV;
based on the received data, detecting an obstruction that at least partially occludes the LIDAR device from scanning the FOV through the housing, wherein detecting the obstruction comprises:
identifying an object scanned by the LIDAR device through a first section of the housing during a first scan of the plurality of scans and through a second section of the housing during a second scan of the plurality of scans; and
comparing a first portion of the first scan associated with the identified object to a second portion of the second scan associated with the identified object;
determining that the obstruction does not occlude the LIDAR device from scanning the FOV through one or more sections of the housing; and
identifying a particular section of the housing interposed between the LIDAR device and the obstruction.

20. The system of claim 19, wherein the system further comprises a cleaning apparatus, and wherein the operations further comprise:
operating the cleaning apparatus based on the identification of the particular section of the housing.

* * * * *